(12) United States Patent
Nakashima

(10) Patent No.: US 12,309,499 B2
(45) Date of Patent: *May 20, 2025

(54) INSPECTION METHOD AND INSPECTION APPARATUS

(71) Applicant: Panasonic Intellectual Property Management Co., Ltd., Osaka (JP)

(72) Inventor: Shinya Nakashima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,332

(22) Filed: Apr. 12, 2024

(65) Prior Publication Data

US 2024/0276103 A1     Aug. 15, 2024

Related U.S. Application Data

(63) Continuation of application No. 17/812,450, filed on Jul. 14, 2022, now Pat. No. 11,991,457.

(30) Foreign Application Priority Data

Jul. 28, 2021  (JP) ................. 2021-123121

(51) Int. Cl.
    *H04N 23/74*     (2023.01)
    *G01N 21/89*     (2006.01)
    (Continued)

(52) U.S. Cl.
    CPC ............. *H04N 23/74* (2023.01); *G01N 21/89* (2013.01); *G06T 7/001* (2013.01); *G06T 7/60* (2013.01);
    (Continued)

(58) Field of Classification Search
    CPC ........ H04N 23/71; H04N 23/56; H04N 23/74; G06V 10/764; G06V 10/60
    See application file for complete search history.

(56) References Cited

U.S. PATENT DOCUMENTS

| 6,263,291 | B1 | 7/2001 | Shakespeare |
| 7,573,575 | B2 | 8/2009 | Shakespeare |
| (Continued) | | | |

FOREIGN PATENT DOCUMENTS

| JP | 2001-99630 | 4/2001 |
| JP | 2009-31726 | 2/2009 |
| (Continued) | | |

OTHER PUBLICATIONS

H.-n Li et al., "Multi-spectral imaging using LED illuminations," 2012 5th International Congress on Image and Signal Processing, Chongqing, China, 2012, pp. 538-542, doi: 10.1109/CISP.2012.6469964 (Year: 2012).

(Continued)

*Primary Examiner* — On S Mung
(74) *Attorney, Agent, or Firm* — Wenderoth, Lind & Ponack, L.L.P.

(57) ABSTRACT

An inspection apparatus includes an illumination device capable of emitting first light in a first wavelength band and reference light in a reference wavelength band overlapping with the first wavelength band, an imaging device that images an inspection body and outputs a pixel signal, and an image processing device. The illumination device emits the first light and the reference light to the inspection body at different timings in one imaging time. The image processing device calculates a first reflectance that is a reflectance in the first wavelength band of the object based on the pixel signal, and determines physical properties of the object based on the first reflectance.

14 Claims, 19 Drawing Sheets

(51) Int. Cl.
   *G06T 7/00*      (2017.01)
   *G06T 7/60*      (2017.01)
   *G06V 10/60*     (2022.01)
   *G06V 10/764*    (2022.01)
   *H04N 23/56*     (2023.01)
   *H04N 23/71*     (2023.01)

(52) U.S. Cl.
   CPC ............ *G06V 10/60* (2022.01); *G06V 10/764* (2022.01); *H04N 23/56* (2023.01); *H04N 23/71* (2023.01); *G06T 2207/10152* (2013.01); *G06T 2207/20224* (2013.01); *G06T 2207/30148* (2013.01); *G06V 2201/06* (2022.01)

(56) References Cited

U.S. PATENT DOCUMENTS

| | | |
|---|---|---|
| 2008/0315136 A1 | 12/2008 | Ryu et al. |
| 2009/0059046 A1 | 3/2009 | Hasegawa |
| 2012/0224042 A1 | 9/2012 | Saijo |
| 2014/0056482 A1 | 2/2014 | Burgstaller |
| 2014/0218504 A1 | 8/2014 | Couturier |
| 2016/0153917 A1 | 6/2016 | Couturier |
| 2017/0337414 A1 | 11/2017 | Ohno et al. |
| 2018/0330490 A1 | 11/2018 | Kido |
| 2019/0271714 A1 | 9/2019 | Kluckner |
| 2020/0191723 A1 | 6/2020 | Kuri |
| 2020/0364889 A1 | 11/2020 | Tsai |
| 2022/0390383 A1 | 12/2022 | Sakane |
| 2022/0405904 A1 | 12/2022 | Nakashima |
| 2023/0021315 A1 | 1/2023 | Martins Loureiro |
| 2023/0144705 A1 | 5/2023 | Martins Loureiro |
| 2023/0181020 A1 | 6/2023 | Pesach |
| 2023/0194599 A1 | 6/2023 | Gilabert |
| 2023/0228691 A1 | 7/2023 | Ritoniemi |

FOREIGN PATENT DOCUMENTS

| | | |
|---|---|---|
| JP | 2010-169643 | 8/2010 |
| JP | 2016-138789 | 8/2016 |
| JP | 2017-190972 | 10/2017 |
| JP | 6673213 | 3/2020 |
| JP | 2020-94955 | 6/2020 |
| JP | 2021-012392 | 2/2021 |
| KR | 20130028458 | 3/2013 |
| WO | 2021/054198 | 3/2021 |
| WO | 2022/163421 | 8/2022 |

OTHER PUBLICATIONS

N.T.D. Hang, T. Horiuchi, K. Hirai and S. Tominaga, "Estimation of Two Illuminant Spectral Power Distributions from Highlights of Overlapping Illuminants," 2013 International Conference on Signal-Image Technology & Internet-Based Systems, Kyoto, Japan, 2013, pp. 434-440, doi: 10.1109/SITIS.2013.77. (Year: 2013).

D. Kwak, G. Son and Y. Kim, "Real-time Detection of Foreign Substance in Seaweed using Pushbroom Hyperspectral Imaging,", 2020 Eighth International Symposium on Computing and Networking Workshops (Candarw), Naha, Japan, 2020, pp. 468-470, doi: 10.1109/CANDARW51189.2020.00096. (Year: 2020).

Yud-Ren Chen, Kuanglin Chao, Moon S Kim, Machine vision technology for agricultural applications, Computers and Electronics in Agriculture, vol. 36, Iss. 2-3, 2002, pp. 173-191, ISSN 0168-1699, http://doi.org/10.1016/S0168-1699(02)00100-X. (Year: 2002).

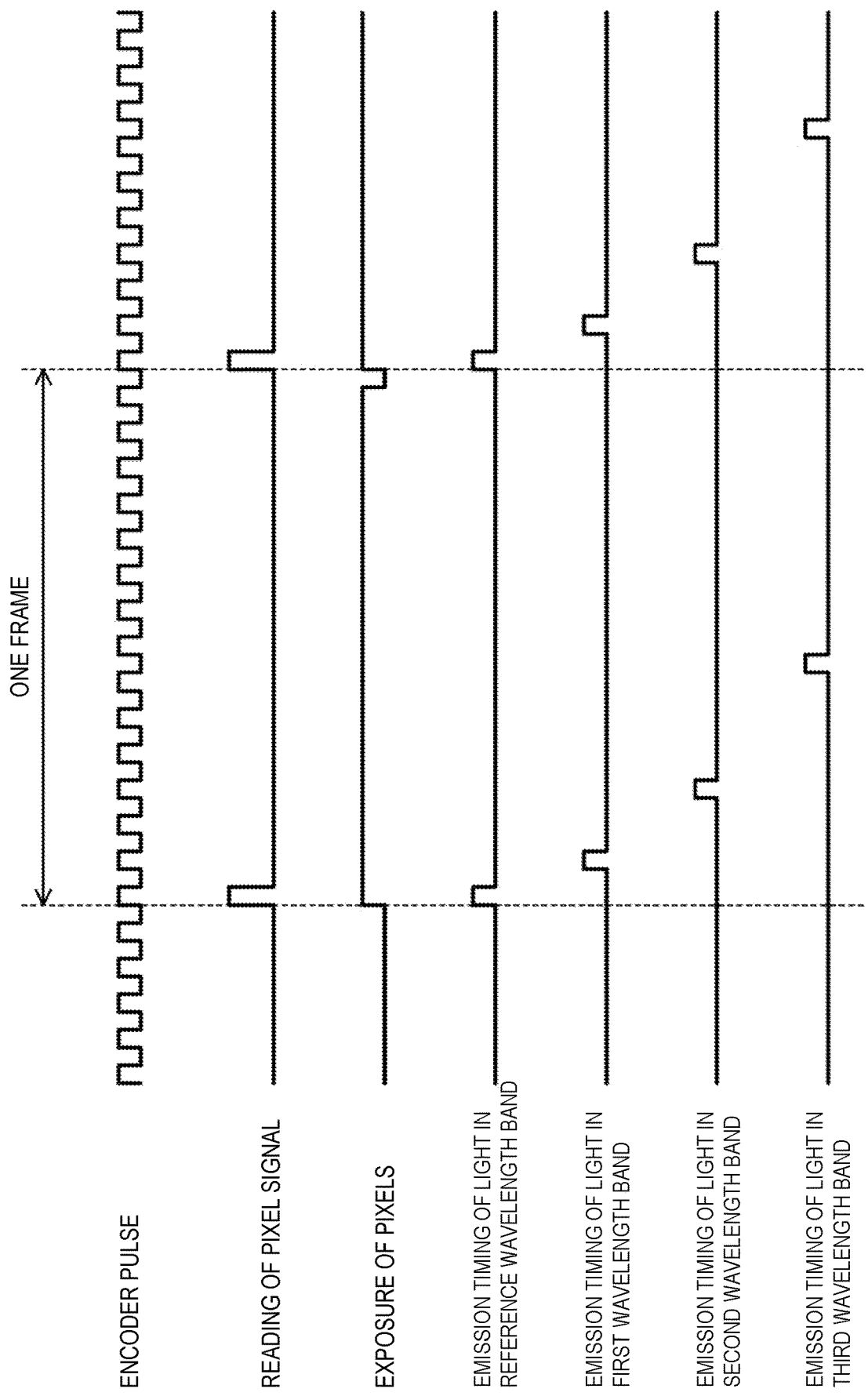

FIG. 14A p11(E11)

δ4 — grid with values:
0 0 0 0 0 0 0
0 50 50 50 50 50 0
0 50 240 240 240 240 50
0 50 250 255 255 240 50
0 50 230 230 230 230 50
0 0 50 50 50 50 0
0 0 0 0 0 0 0

FIG. 14B p12(E12)

α4 — grid with values:
0 0 0 0 0 0 0
0 27 27 27 27 27 0
0 27 125 125 125 125 27
0 27 140 140 140 125 27
0 27 115 115 115 115 27
0 0 27 27 27 27 0
0 0 0 0 0 0 0

FIG. 14C p13(E13)

β4 — grid with values:
0 0 0 0 0 0 0
0 30 30 30 30 30 0
0 30 140 140 140 140 30
0 30 150 155 155 140 30
0 30 130 130 130 130 30
0 0 30 30 30 30 0
0 0 0 0 0 0 0

FIG. 14D p14(E14)

γ4 — grid with values:
0 0 0 0 0 0 0
0 30 30 30 30 30 0
0 30 140 140 140 140 30
0 30 150 155 155 140 30
0 30 130 130 130 130 30
0 0 30 30 30 30 0
0 0 0 0 0 0 0

FIG. 14E p15(E15)

Grid:
0 0 0 0 0
0 150 255 150 0
0 255 255 255 0
0 150 255 150 0
0 0 0 0 0

FIG. 14F p16(E16)

Grid:
0 0 0 0 0
0 225 255 225 0
0 255 255 255 0
0 225 255 225 0
0 0 0 0 0

FIG. 15G p17(E17)

| 0 | 0 | 0 | 0 | 0 |
|---|---|---|---|---|
| 0 | 110 | 204 | 110 | 0 |
| 0 | 204 | 204 | 204 | 0 |
| 0 | 110 | 204 | 110 | 0 |
| 0 | 0 | 0 | 0 | 0 |

FIG. 15H a1  p18(E18)

| 0 | 0 | 0 | 0 | 0 |
|---|---|---|---|---|
| 0 | 100 | 150 | 100 | 0 |
| 0 | 150 | 150 | 150 | 0 |
| 0 | 100 | 150 | 100 | 0 |
| 0 | 0 | 0 | 0 | 0 |

FIG. 15I p19(E19)

| 0 | 0 | 0 | 0 | 0 |
|---|---|---|---|---|
| 0 | 110 | 204 | 110 | 0 |
| 0 | 204 | 204 | 204 | 0 |
| 0 | 110 | 204 | 110 | 0 |
| 0 | 0 | 0 | 0 | 0 |

FIG. 15J p20(E20)

| 0 | 0 | 0 | 0 | 0 |
|---|---|---|---|---|
| 0 | 110 | 204 | 110 | 0 |
| 0 | 204 | 204 | 204 | 0 |
| 0 | 110 | 204 | 110 | 0 |
| 0 | 0 | 0 | 0 | 0 |

FIG. 15K p21(E21)

| 0 | 0 | 0 | 0 | 0 |
|---|---|---|---|---|
| 0 | 110 | 204 | 110 | 0 |
| 0 | 204 | 204 | 204 | 0 |
| 0 | 110 | 204 | 110 | 0 |
| 0 | 0 | 0 | 0 | 0 |

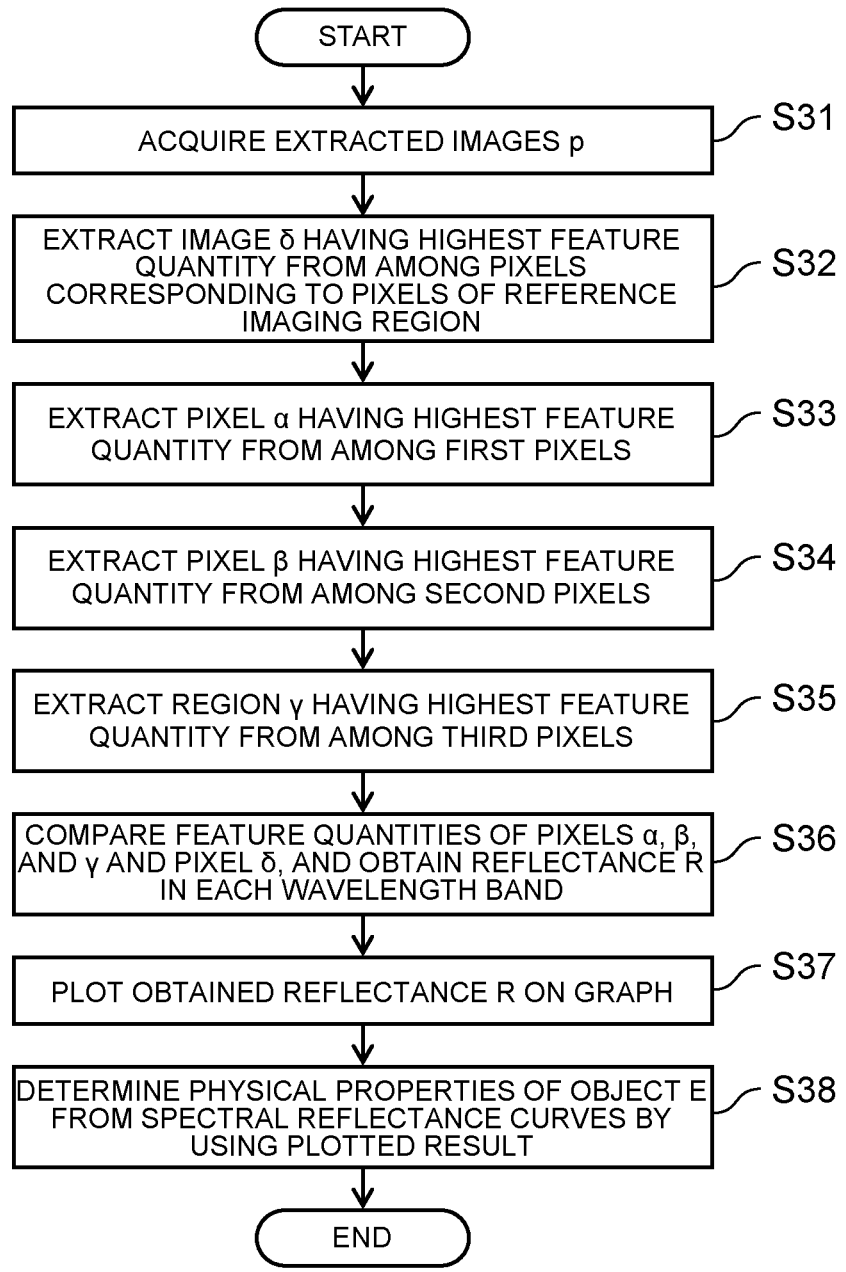

INSPECTION METHOD AND INSPECTION APPARATUS

CROSS REFERENCE TO RELATED APPLICATIONS

This is a continuation application of U.S. application Ser. No. 17/812,450 filed on Jul. 14, 2022, which is based on and claims priority of Japanese Patent Application No. 2021-123121 filed on Jul. 28, 2021. The entire disclosures of the above-identified applications, including specifications, drawings and claims are incorporated herein by reference in their entirety.

BACKGROUND

1. Technical Field

The present disclosure relates to an inspection apparatus and an inspection method for an inspection body.

2. Description of the Related Art

In a device field such as semiconductors, electronic devices, or secondary batteries, an inspection apparatus is known which uses an image sensor to detect an object (foreign substance, defect, or the like) of an inspection body.

In Unexamined Japanese Patent Publication No. 2016-138789 (JP '789), a foreign substance or the like (object) mixed in an inspection object (inspection body) is detected by generating spectral image in a plurality of wavelength bands and comparing a feature quantity of the spectral image with a feature quantity of normal data. That is, in JP '789, the object is detected by using a difference in physical properties between the inspection body and the object.

SUMMARY

An inspection method according to an exemplary embodiment of the present disclosure is an inspection method for detecting an object included in an inspection body by imaging the inspection body by an inspection apparatus. The inspection apparatus includes an illumination device that is capable of emitting first light in a first wavelength band and reference light in a reference wavelength band overlapping with the first wavelength band, an imaging device that images the inspection body, and outputs a pixel signal, and an image processing device. The inspection method includes emitting, by the illumination device, the first light and the reference light to the inspection body at different timings in one imaging time, calculating, by the image processing device, a first reflectance that is a reflectance of the object in the first wavelength band based on the pixel signal, and determining, by the image processing device, physical properties of the object based on the first reflectance.

An inspection method according to another exemplary embodiment of the present disclosure is an inspection method for detecting an object included in an inspection body by imaging the inspection body by an inspection apparatus. The inspection apparatus includes an illumination device that is capable of emitting first light in a first wavelength band, second light in a second wavelength band, and reference light in a reference wavelength band overlapping with the first and second wavelength bands, an imaging device that images the inspection body, and outputs a pixel signal, and an image processing device. The inspection method includes emitting, by the illumination device, the first light, the second light, and the reference light to the inspection body at timings different from each other in one imaging time, calculating, by the image processing device, a first reflectance that is a reflectance of the object in the first wavelength band and a second reflectance that is a reflectance in the second wavelength band based on the pixel signal, and determining, by the image processing device, physical properties of the object based on the first reflectance and the second reflectance.

An inspection apparatus according to an exemplary embodiment of the present disclosure is an inspection apparatus that detects an object included in an inspection body by imaging the inspection body. The inspection apparatus includes an illumination device that is capable of emitting first light in a first wavelength band and reference light in a reference wavelength band overlapping with the first wavelength band, an imaging device that images the inspection body, and outputs a pixel signal, an image processing device. The illumination device emits the first light and the reference light to the inspection body at different timings in one imaging time, and the image processing device calculates a first reflectance that is a reflectance of the object in the first wavelength band based on the pixel signal, and determines physical properties of the object based on the first reflectance.

BRIEF DESCRIPTION OF THE DRAWINGS

FIG. 11 is a timing chart illustrating an imaging timing of an imaging device and an emission timing of an illumination device in an inspection apparatus according to a second exemplary embodiment;

FIG. 14A is a diagram illustrating an example of a luminance value of an extracted image according to the second exemplary embodiment;

FIG. 14B is a diagram illustrating an example of the luminance value of the extracted image according to the second exemplary embodiment;

FIG. 14C is a diagram illustrating an example of the luminance value of the extracted image according to the second exemplary embodiment;

FIG. 14D is a diagram illustrating an example of the luminance value of the extracted image according to the second exemplary embodiment;

FIG. 14E is a diagram illustrating an example of the luminance value of the extracted image according to the second exemplary embodiment;

FIG. 14F is a diagram illustrating an example of the luminance value of the extracted image according to the second exemplary embodiment;

FIG. 15G is a diagram illustrating an example of the luminance value of the extracted image according to the second exemplary embodiment;

FIG. 15H is a diagram illustrating an example of the luminance value of the extracted image according to the second exemplary embodiment;

FIG. 15I is a diagram illustrating an example of the luminance value of the extracted image according to the second exemplary embodiment;

FIG. 15J is a diagram illustrating an example of the luminance value of the extracted image according to the second exemplary embodiment;

FIG. 15K is a diagram illustrating an example of the luminance value of the extracted image according to the second exemplary embodiment;

FIG. 18 is a flowchart depicting a flow of physical property determination processing of the image processing device according to the second exemplary embodiment.

DETAILED DESCRIPTIONS

In a case where a plurality of spectral images are generated by one sensor element by using the technology of JP '789, since it is necessary to capture the inspection body for each wavelength band, an imaging time increases. In particular, as the number of generated spectral images increases, the imaging time increases.

Therefore, an objective of the present disclosure is to provide an inspection method and an inspection apparatus capable of determining physical properties of an object while suppressing an increase in an imaging time.

Hereinafter, exemplary embodiments of the present disclosure will be described in detail with reference to the drawings. The following descriptions of preferable exemplary embodiments are substantially examples, and are not intended to limit the present disclosure, or applications or uses of the present disclosure.

Figure 1:
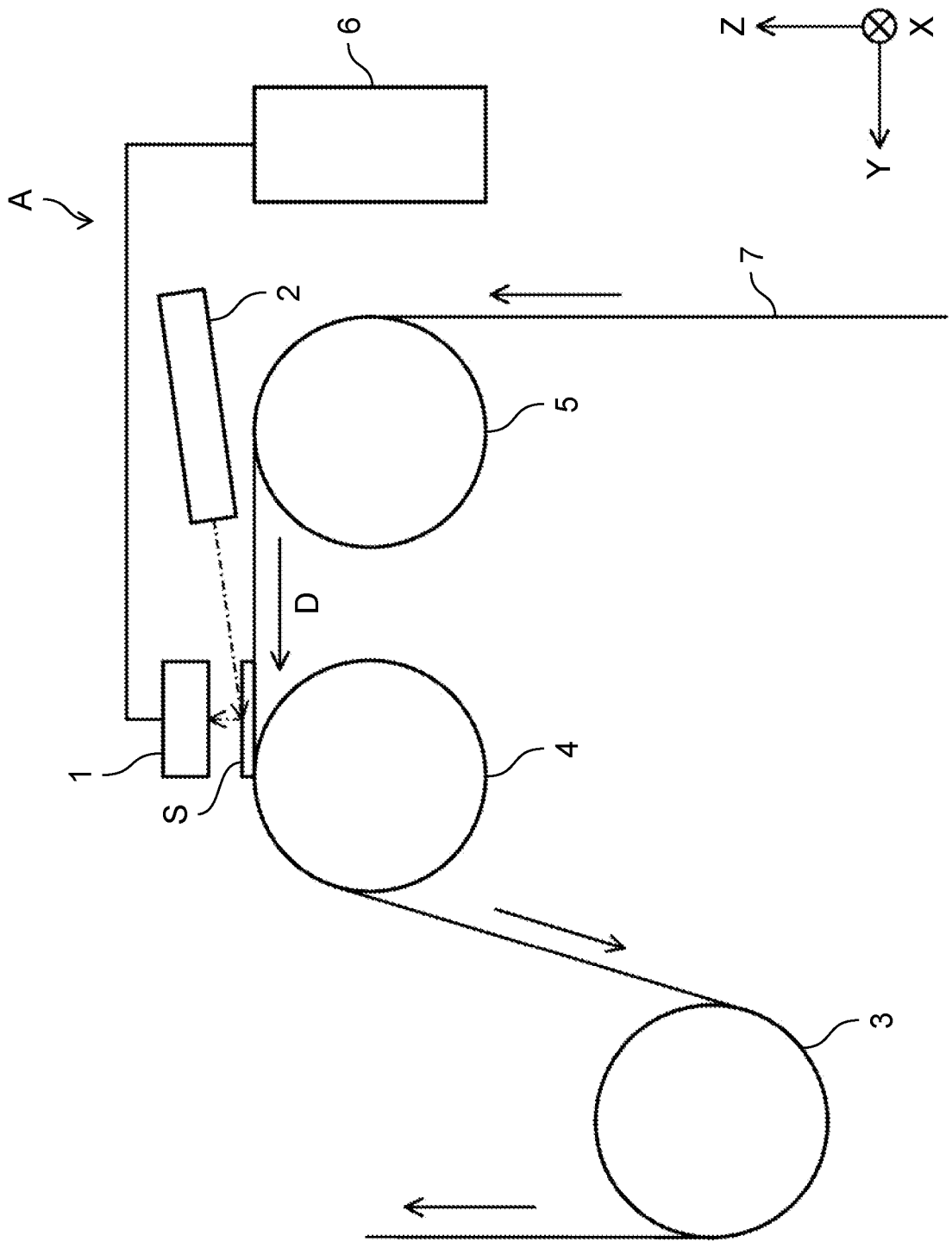
FIG. 1 is a side view of an inspection apparatus according to a first exemplary embodiment.
Figure 2:
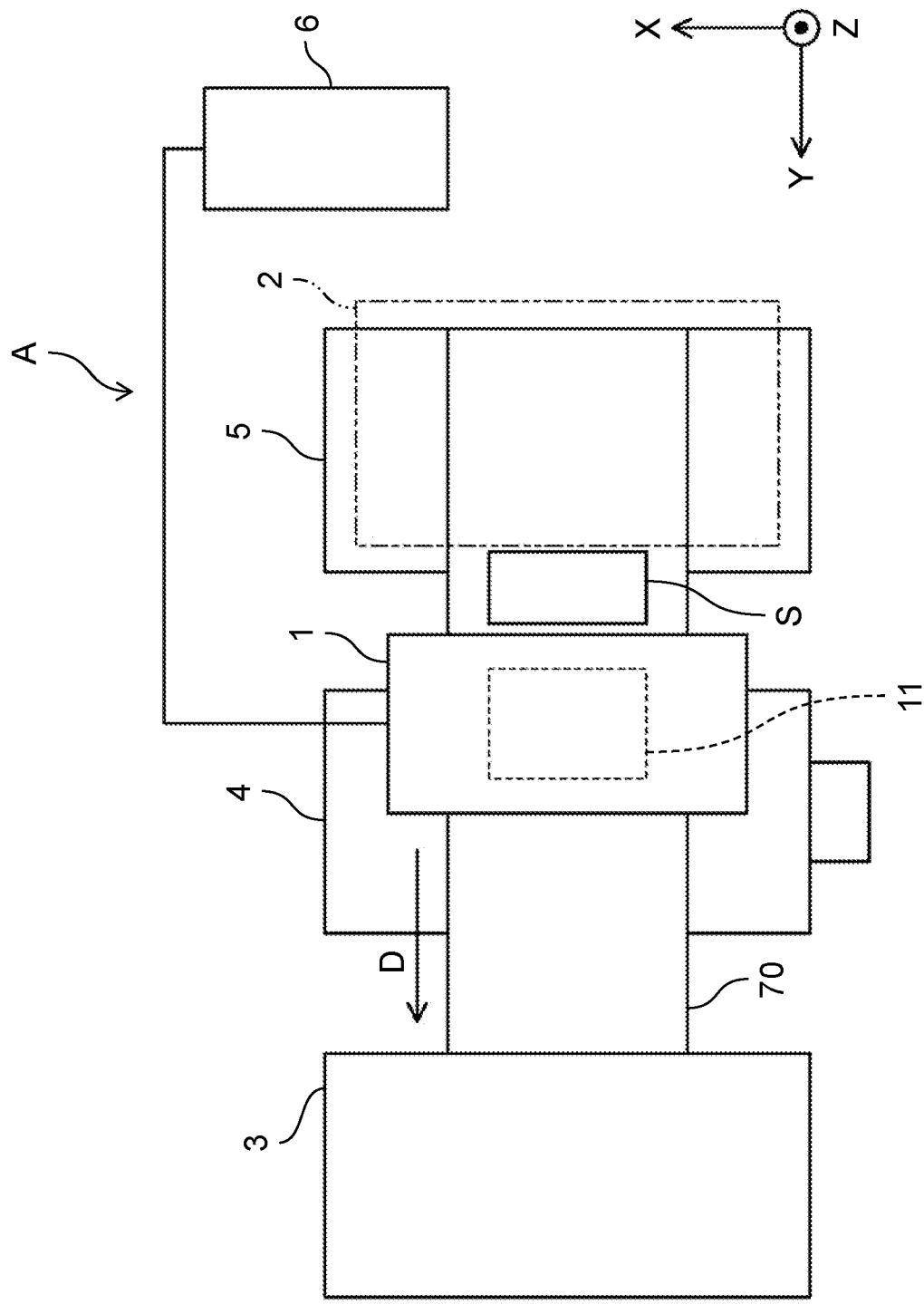
FIG. 2 is a plan view of the inspection apparatus according to the first exemplary embodiment.

FIG. 1 is a side view of an inspection apparatus, and FIG. 2 is a plan view of the inspection apparatus. As illustrated in FIGS. 1 and 2, inspection apparatus A includes imaging device 1, illumination device 2, rollers 3 to 5, and image processing device 6. Conveyor belt 7 is wound around outer peripheries of rollers 3 to 5.

Inspection apparatus A inspects sheet S (inspection body). Sheet S is used, for example, in a device field such as semiconductors, electronic devices, or secondary batteries. Note that, in the following description, a case where the inspection body has a sheet shape will be described as an example, but the inspection body may not have a sheet shape. Furthermore, when sheet S is a long object, sheet S is wound around rollers 3 to 4 instead of conveyor belt 7. Sheet S is conveyed in a direction of arrow D by rollers 3 to 5.

Inspection apparatus A detects object E such as a defect or a foreign substance included in sheet S. The defect includes, for example, not only an incomplete portion or a deficient portion from the time of production of sheet S, such as a short circuit or a disconnection in inspected sheet S, but also damage (for example, a scratch mark due to contact between sheet S and another member) to sheet S. When detected object E is larger than a predetermined size, the inspection apparatus determines that the object is included in sheet S. Note that sheet S is conveyed in the direction of arrow D indicated by a solid line in FIGS. 1 and 2 in a state of being placed on conveyor belt 7.

Imaging device 1 includes imaging element 11 and captures sheet S being conveyed by conveyor belt 7. Here, imaging device 1 is configured as an area sensor that captures entire sheet S between rollers 4 and 5. Note that imaging device 1 may be configured not as an area sensor but as a line sensor.

Imaging device 1 transmits a pixel signal output from imaging element 11 to image processing device 6. Note that, in the following description, a main scanning direction of imaging device 1 is an X direction, a sub-scanning direction of imaging device 1 is a Y direction, and a direction perpendicular to the X direction and the Y direction is a Z direction.

Illumination device 2 includes, for example, a light source including elements such as a light-emitting diode (LED), a laser, and a halogen light source, and emits light between rollers 4 and 5 to a scanning region (sheet S) of imaging device 1. Specifically, illumination device 2 is installed such that a light emission direction has an incident angle of about 10° with respect to conveyor belt 7. Furthermore, imaging device 1 and illumination device 2 are configured as a dark field optical system so that light emitted from illumination device 2 does not directly enter imaging element 11. Imaging device 1 and illumination device 2 may be configured as a bright field optical system, but are preferably configured as a dark field optical system. Through the configuration of the dark field optical system, illumination can be applied to object E at a low angle, so that a base of object E does not shine (the brightness of the base (ground level) where there is no foreign substance has a low gradation). As a result, the luminance of object E becomes higher than the luminance of the base, and a signal noise (SN (luminance of foreign substance/luminance of base)) ratio increases, so that a clear image of object E can be generated. As will be described in detail later, illumination device 2 can emit light rays in a plurality of wavelength bands.

Roller 3 is rotated by an unillustrated driving mechanism to drive conveyor belt 7, thereby conveying sheet S in a direction indicated by a solid arrow in the drawing.

Image processing device 6 is a computer, for example. Image processing device 6 determines the physical properties and the size of object E based on the pixel signal received from imaging device 1 (imaging element 11). Specifically, image processing device 6 executes image extraction processing, physical property determination processing, image correction processing, and size determination processing to be described later.

Note that a configuration of inspection apparatus A is not limited to the above-described configuration.

Furthermore, inspection apparatus A may include a rotary encoder that detects rotation speeds of rollers 3 to 5. In this case, a movement amount of sheet S conveyed by conveyor belt 7 may be detected based on the detection result of the rotary encoder.

First Exemplary Embodiment

Configuration of Imaging Element

Figure 3:
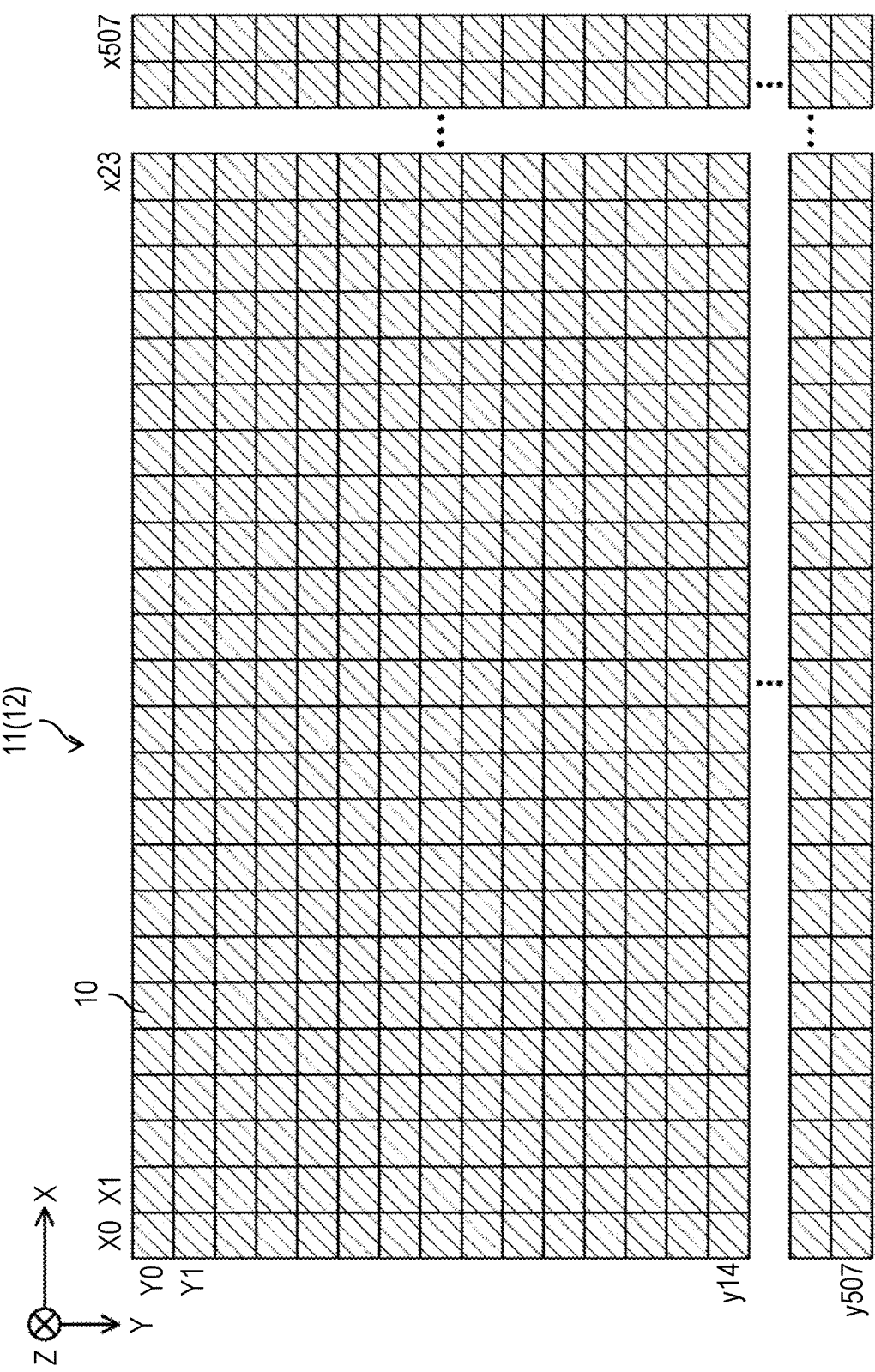
FIG. 3 is a plan view illustrating a configuration of an imaging element according to the first exemplary embodiment.

FIG. 3 is a plan view illustrating a configuration of an imaging element according to a first exemplary embodiment. Examples of imaging element 11 include a complementary metal-oxide semiconductor (CMOS) image sensor.

As illustrated in FIG. 3, imaging element 11 includes pixel array 12 in which m pixels 10 in the X direction and n pixels 10 in the Y direction (508×508 in FIG. 3) are arranged in a lattice pattern. Note that, in the following description, i-th pixel 10 in the X direction and j-th pixel 10 in the Y direction may be referred to as a pixel (Xi, Yj).

Operation of Imaging Device and Illumination Device

Figure 4:
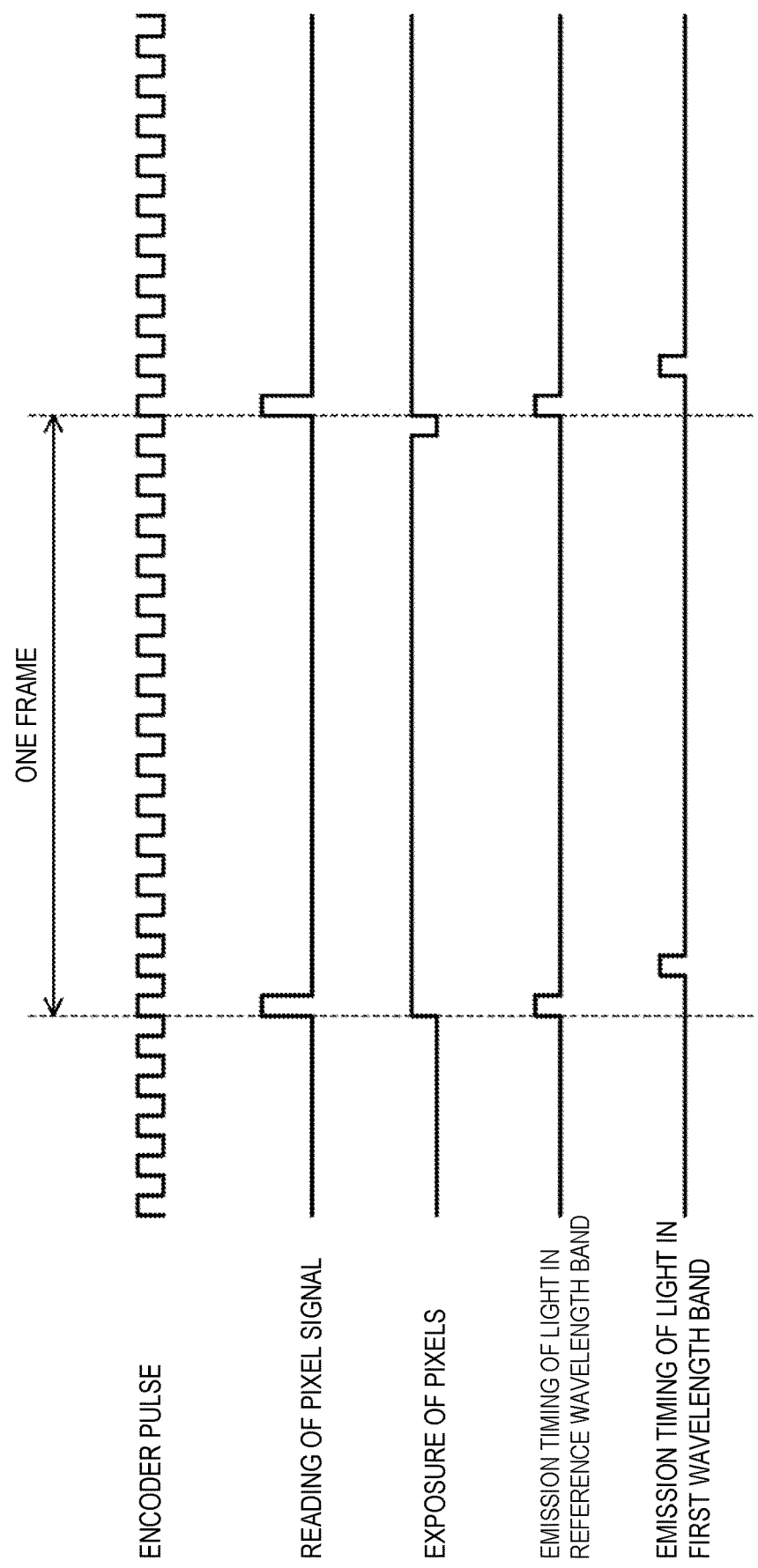
FIG. 4 is a timing chart illustrating an imaging timing of an imaging device and an emission timing of an illumination device in the inspection apparatus according to the first exemplary embodiment.

First, operations of the imaging device and the illumination device when sheet S (inspection body) is captured will be described. FIG. 4 is a timing chart illustrating an imaging timing of the imaging device and an emission timing of the illumination device in the inspection apparatus according to the first exemplary embodiment. In the present exemplary embodiment, the imaging timing of imaging device 1 and the emission timing of illumination device 2 are set as a basis of an encoder pulse. In the encoder pulse of FIG. 4, one pulse is, for example, 1 μm, but the encoder pulse is not limited thereto.

Furthermore, in the present exemplary embodiment, illumination device 2 can emit light rays in a first wavelength band and a reference wavelength band. For example, the first wavelength band is a red wavelength band (625 nm to 780 nm), and the reference wavelength band is 400 nm to 800 nm. Furthermore, the reference wavelength band may not include the entire first wavelength band, and may include a part of the first wavelength band. For example, when the first wavelength band is 625 nm to 780 nm, the reference wavelength band may be 400 nm to 700 nm. That is, the reference wavelength band may be a wavelength band overlapping with the first wavelength band.

As illustrated in FIG. 4, exposure of pixel 10 (imaging element 11), reading of a pixel signal, and light emission by illumination device 2 are performed in one frame. When imaging device 1 is the area sensor, a reading interval between pixel signals is set to be less than or equal to a frame rate. Furthermore, when imaging device 1 is the line sensor, a reading interval between pixel signals is set to be less than or equal to a minimum scan rate. In the present exemplary embodiment, imaging device 1 is an area image sensor, the frame rate is 240 fps (4.17 msec/time), and a conveyance speed of sheet S is less than or equal to 2500 mm/sec. That is, the pixel signal is read every 12500 encoder pulses, that is, every 12.5 mm. In this case, a maximum speed at which imaging device 1 can normally perform imaging is 12.5 mm÷(1/240) (sec)=3000 mm/sec, and imaging device 1 normally operates at a feeding speed less than or equal to than the maximum speed.

Furthermore, illumination device 2 emits light rays in two different wavelength bands (here, the first wavelength band and the reference wavelength band) at different timings within one imaging time (exposure time). Specifically, illumination device 2 emits light in the reference wavelength band after a predetermined pulse (for example, 0 pulses to 100 pulses) from the start of exposure. A turning-on time at this time is 2 μsec to 5 μsec. Furthermore, illumination device 2 emits light in the first wavelength band after a predetermined pulse (for example, 2500 pulses) from the start of exposure. A turning-on time at this time is 3 μsec. Note that, since illumination device 2 emits light rays in the first wavelength band and the reference wavelength band within one exposure time, a time for switching between the light rays to be emitted is required. Thus, the exposure time is set to be longer than an emission time and a switching time of illumination device 2, and is set to, for example, 3.9 msec.

Operation of Image Processing Device

An inspection method for an inspection body according to the first exemplary embodiment will be described with reference to FIGS. 5 to 10C.

Figure 5:
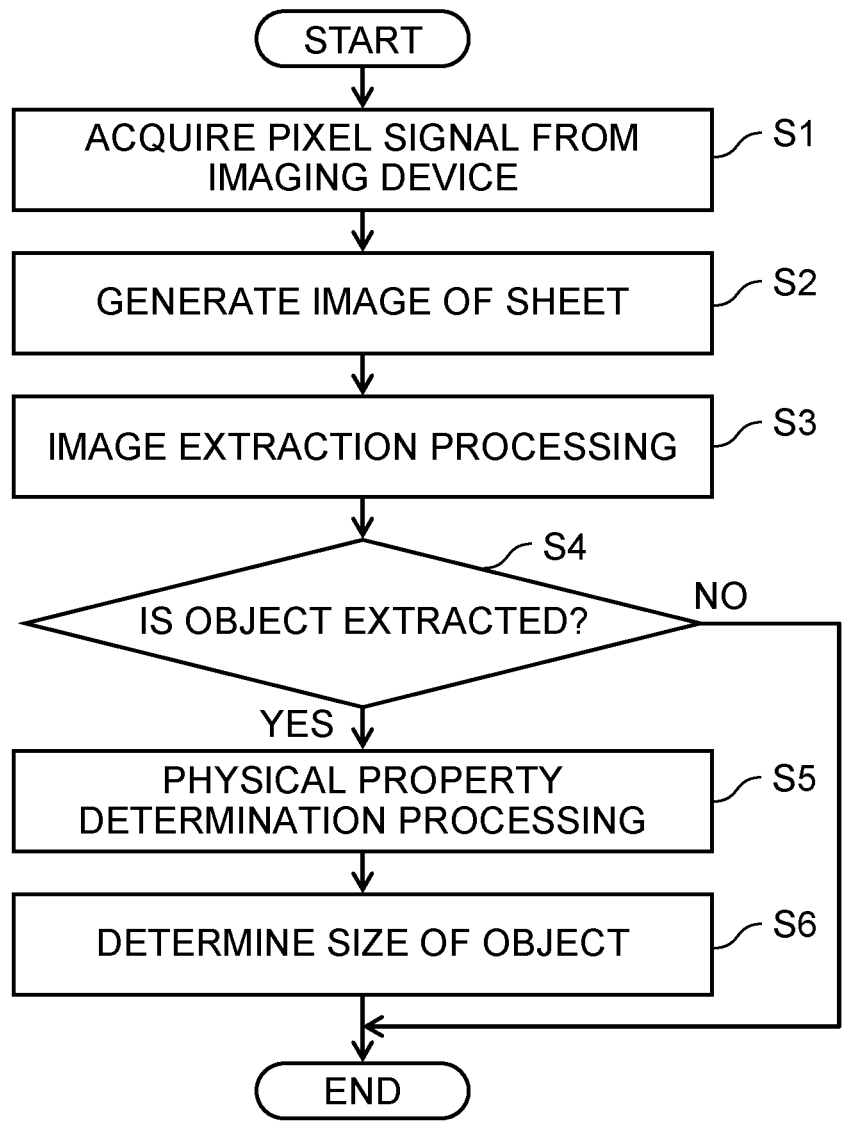
FIG. 5 is a flowchart depicting an overall operation flow of an image processing device according to the first exemplary embodiment.

FIG. 5 is a flowchart depicting an overall operation flow of the image processing device according to the first exemplary embodiment.

Imaging device 1 (imaging element 11) captures sheet S (inspection body) conveyed by conveyor belt 7 between rollers 4 and 5 as described above. At this time, sheet S is captured according to the timing chart of FIG. 4. Image processing device 6 acquires (receives) the pixel signal output from imaging device 1 (step S1).

Image processing device 6 generates image P of sheet S based on the pixel signal acquired from imaging device 1 (step S2). Image processing device 6 executes image extraction processing to be described later and generates extracted images p from image P (step S3).

Image processing device 6 determines whether or not extracted image p of object E is included in image P (step S4). When it is determined that extracted image p of object E is not included in image P (No in step S4), image processing device 6 ends the processing. That is, image processing device 6 determines that object E is not included in sheet S.

When it is determined that the image of object E is included in image P (Yes in step S4), image processing device 6 executes physical property determination processing to be described later (step S5) to determine the physical properties of object E. Image processing device 6 uses generated corrected image pw to determine the size of object E (step S6).

Image Extraction Processing

Next, image extraction processing of image processing device 6 will be described with reference to FIGS. 6 and 7.

Figure 6:
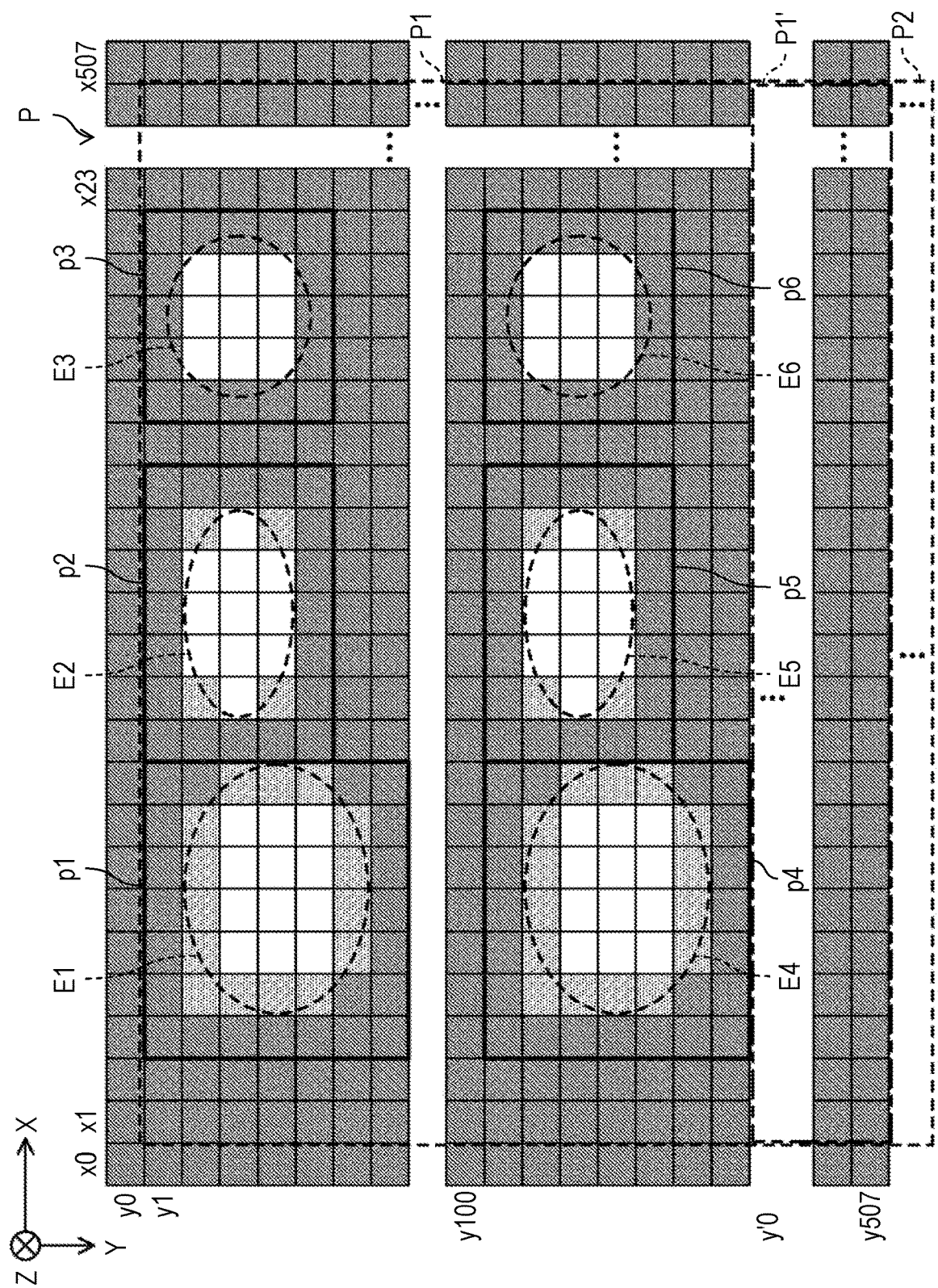
FIG. 6 is a diagram illustrating an example image of a sheet captured by the imaging element according to the first exemplary embodiment.

FIG. 6 is a diagram illustrating an example image of the sheet captured by the imaging element according to the first exemplary embodiment. FIG. 7 is a diagram illustrating an example of luminance values of the sheet captured by the imaging element according to the first exemplary embodiment.

In step S2, image processing device 6 generates image P based on the pixel signal acquired from imaging element 11. Image P includes images P1 to Pi (not illustrated). Since sheet S is captured a plurality of times (here, i times) between rollers 4 and 5, image P includes images P1 to Pi. Note that, in the following description, an image captured for an i-th time is referred to as image Pi.

In the present exemplary embodiment, since the turning-on time of illumination device 2 is sufficiently shorter than the conveyance speed of rollers 4 and 5, the captured image does not extend in the Y direction. When the turning-on time is sufficiently longer than the conveyance speed, image Pi extends in the Y direction. For example, when object E is captured at a resolution of 25 µm, a conveyance speed of 2500 mm/sec, and a turning-on time of 10 µsec, 2500 (mm/sec)×10 µsec=25 µm, which is longer by approximately 2 pixels in the Y direction.

Furthermore, in order to prevent overlooking of object E, an acquisition interval is provided such that overlapping area P1' is provided between the images. Specifically, as illustrated in FIGS. 6 and 7, overlapping area P1' is provided between images P1 and P2. In FIGS. 6 and 7, a width of overlapping area P1' in the Y direction is set to about 16 Pix (0.4 mm). Note that the overlapping area can be arbitrarily set.

In step S3, image processing device 6 executes image extraction processing. Specifically, image processing device 6 extracts extracted image p of object E based on a feature quantity of each image (xi, yj) in image P. Examples of the feature quantity include a luminance value and brightness for each image (xi, yj) in image P. Furthermore, the feature quantities may be determined as a basis of a feature quantity of sheet S not including object E. Furthermore, the presence or absence of object E is determined by using a feature quantity such as a surface area value, a size in the X direction, a size in the Y direction, a shape, and a concentration sum of object E. In the present exemplary embodiment, a case where the feature quantity is a luminance value of each image (xi, yj) in image P will be described as an example.

Figure 7:
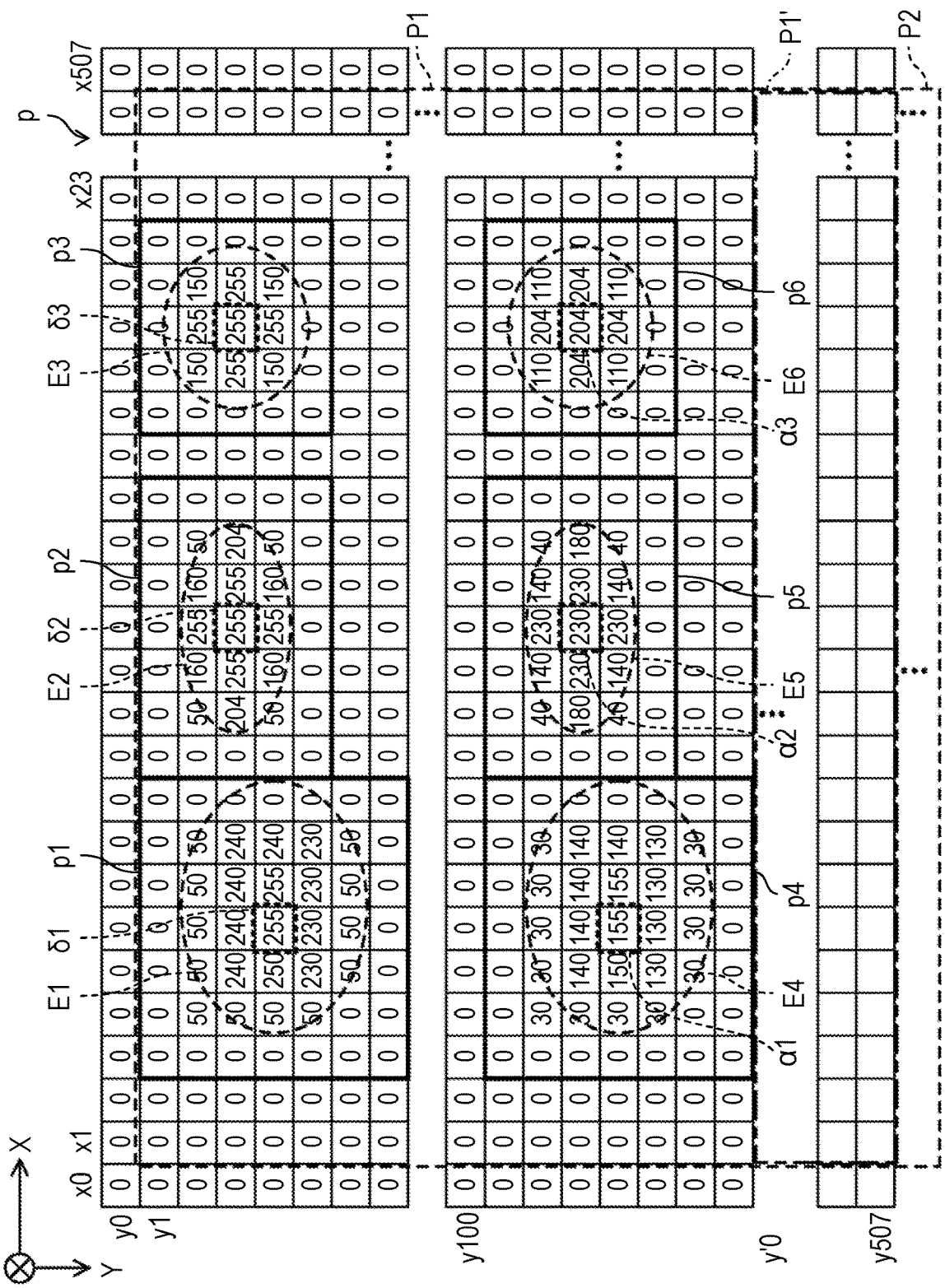
FIG. 7 is a diagram illustrating an example of luminance values of the sheet captured by the imaging element according to the first exemplary embodiment.

FIG. 7 illustrates the luminance value for each image (xi, yj) in image P. In FIG. 7, the luminance values are displayed in 256 gradations of 8 bits, and a minimum value of the luminance values is 0 and a maximum value is 255. In FIG. 7, when object E is not present on sheet S (ground level), luminance values are 0.

First, image processing device 6 extracts an image (xi, yj) having a luminance value greater than or equal to a threshold value. Image processing device 6 sets, as one object E, a plurality of adjacent images (xi, yj) among the extracted images. The term "adjacent images" as used herein refers to images that are in contact with one image in the X direction (horizontal direction), in the Y direction (vertical direction), or in the X direction and the Y direction (oblique direction). Specifically, in the case of the image (xi, yj), images (xi, yj±1), (xi±1, yj), and (xi±1, yj±1) are adjacent images. Image processing device 6 generates extracted images p so as to include extracted object E.

For example, in FIG. 7, when the threshold value of the luminance values is set to 20, image processing device 6 extracts, as images including objects E1 to E6, regions of images (xi, yj) surrounded by solid lines. Image processing device 6 generates extracted images p1 to p6 so as to include objects E1 to E6 (see FIGS. 6 and 7). Specifically, an image included in a region of images (x3, y1) to (x9, y7) is extracted as extracted image p1. An image included in a region of the images (x10, y1) to (x16, y5) is extracted as extracted image p2. An image included in the region of the images (x18, y1) to (x22, y5) is extracted as extracted image p3. An image included in the region of the images (x3, y101) to (x9, y107) is extracted as extracted image p4. An image included in the region of the images (x10, y101) to (x16, y105) is extracted as extracted image p5. An image included in the region of the images (x18, y101) to (x22, y105) is extracted as extracted image p6.

Note that, when extracted images p are generated from image P, image processing device 6 determines in step S4 that extracted image p of object E is included in image P.

Physical Property Determination Processing

Figure 8:
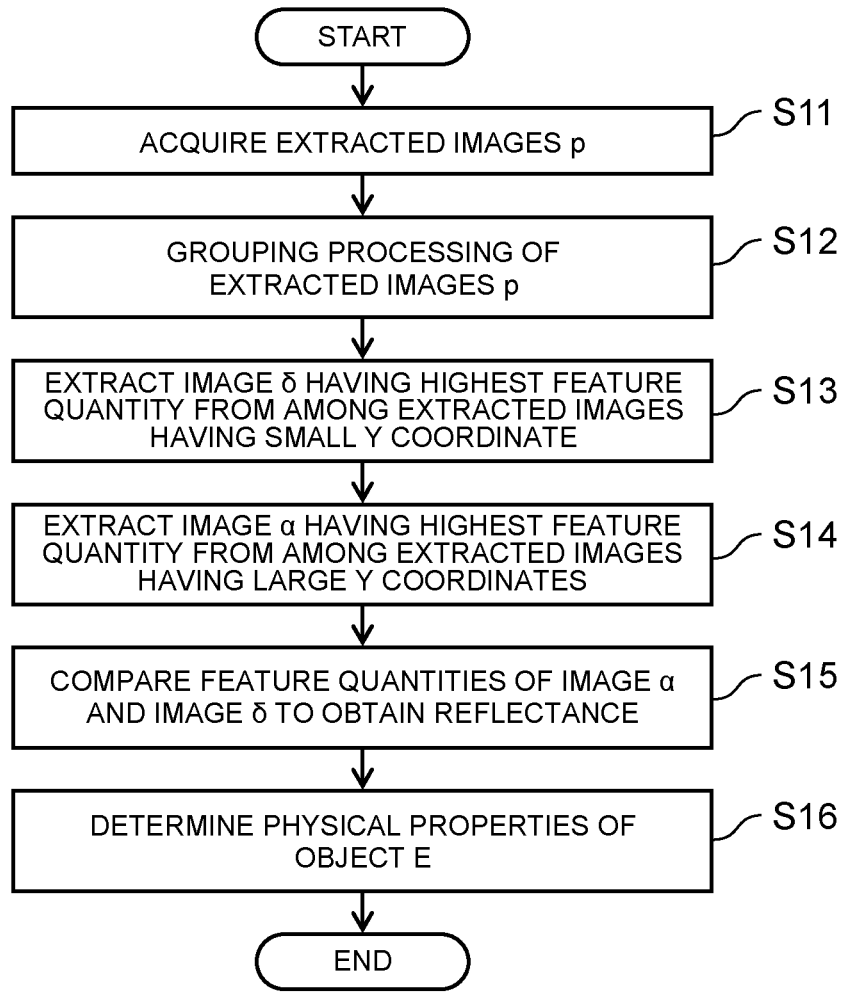
FIG. 8 is a flowchart depicting a flow of physical property determination processing of the image processing device according to the first exemplary embodiment.

Next, physical property determination processing (step S5) of image processing device 6 will be described with reference to FIGS. 6 to 9. FIG. 8 is a flowchart depicting a flow of the physical property determination processing of the image processing device according to the first exemplary embodiment.

When extracted images p (in FIGS. 6 and 7, extracted images p1 to p6) are acquired (step S11), image processing device 6 performs grouping processing of extracted images p (step S12). Specifically, image processing device 6 classifies extracted images p having the same X coordinate into the same group. For example, in FIGS. 6 and 7, extracted images p1 and p4 are classified into the same group, extracted images p2 and p5 are classified into the same group, and extracted images p3 and p6 are classified into the same group.

As described above, illumination device 2 emits light rays in two different wavelength bands (here, the first wavelength band and the reference wavelength band) at different timings within one exposure time. Thus, in image P, two extracted images p are generated for one object E. Furthermore, in the present exemplary embodiment, after the light in the reference wavelength band is emitted, the light in the first wavelength band is emitted. That is, two extracted images p generated for one object E are included in image P in a state of being offset in the Y direction. Thus, extracted images p having the same X coordinate is an image indicating same object E. Extracted images p having the same X coordinate are classified into the same group, and thus, it can be determined that extracted images p belonging to the same group are images indicating same object E. That is, in the present exemplary embodiment, it can be determined that objects E1 and E4 are the same object, objects E2 and E5 are the same object, and objects E3 and E6 are the same object.

Furthermore, in the present exemplary embodiment, since the light in the first wavelength band is emitted after the light in the reference wavelength band is emitted, in the same group, it can be determined that extracted images p (p1 to p3) having a small Y coordinate are extracted images generated by the emission of the light in the reference wavelength band and extracted images p (p4 to p6) having a large Y coordinate are extracted images generated by the emission of the light in the first wavelength band.

After step S12, image δ having a highest feature quantity is extracted from among the images included in extracted images p having the small Y coordinate from extracted images p belonging to the same group (step S13).

Image processing device 6 extracts image α having a highest feature quantity from among the images included in extracted images p having the large Y coordinate among extracted images p belonging to the same group (step S14).

In FIG. 7, in extracted images p1 to p3, images δ1 to δ3 (luminance values 255, 255, and 255) correspond to images δ, and images α1 to α3 (luminance values 155, 230, and 204) correspond to images α.

After step S14, reflectance R of object E in the first wavelength band is obtained based on feature quantities (luminance values) of images δ and images α (step S15). Specifically, reflectance R can be obtained by (luminance values of images α)/(luminance values of images δ). Image α is a spectral image in the first wavelength band, and image δ is a spectral image in the reference wavelength band including the first wavelength band. Thus, reflectance R of object E in the first wavelength band can be obtained by comparing the luminance values (feature quantities) of image α and image δ.

For example, in FIG. 7, reflectance R1 of object E1 (E4) is 155/255≈ 0.60, and reflectance R1 of object E1 is 60%. Reflectance R2 of object E2 (E5) is 235/255≈ 0.90, and reflectance R2 of object E2 is 90%. Reflectance R3 of object E3 (E6) is 204/255=0.80, and reflectance R3 of object E3 is 80%.

After step S14, image processing device 6 determines the physical properties of object E based on calculated reflectance R (step S16). Specifically, image processing device 6 determines the physical properties of object E based on a preset threshold value. This threshold value is set based on spectral reflectance curves (spectral reflectance data, see FIG. 9) indicating spectral reflectances of a plurality of substances. Image processing device 6 determines the physical properties of object E by comparing reflectance R to the threshold value.

Figure 9:
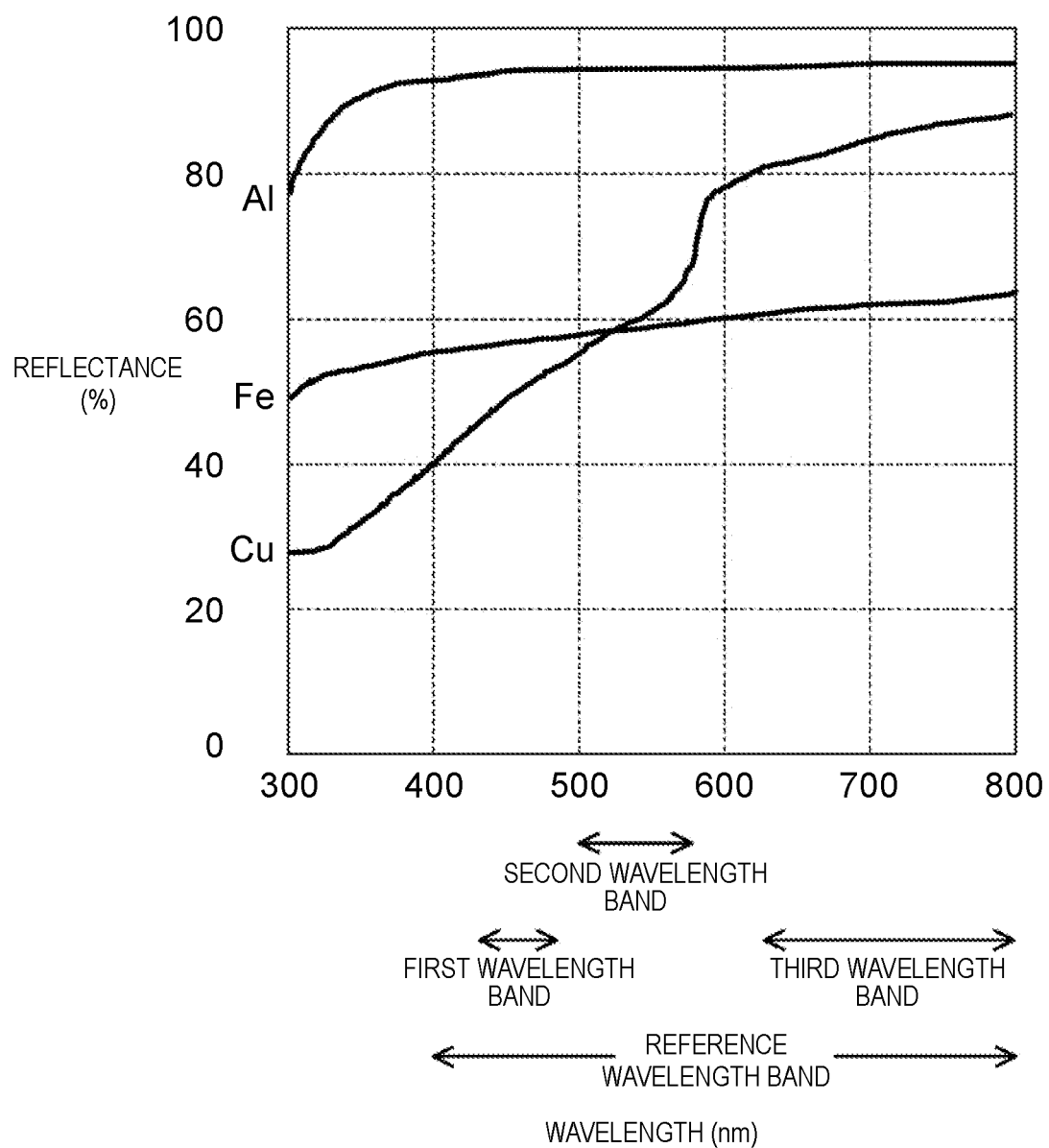
FIG. 9 is a graph representing spectral reflectance curves indicating spectral reflectances of a plurality of substances.

FIG. 9 illustrates spectral reflectance curves of Al, Fe, and Cu in the wavelength bands. Since the first wavelength band is 625 nm to 780 nm, it can be determined that object E is Fe when the reflectance is 50% to 70%, object E is Cu when the reflectance is 70% to 90%, and object E is Al when the reflectance is 90% or more. Specifically, since reflectance R1 of object E1 (E4) is 60%, object E1 is determined to be Fe. Since reflectance R2 of object E2 (E5) is 90%, object E2 is determined to be Al. Since reflectance R3 of object E3 (E6) is 80%, object E3 is determined to be Fe. In this manner, the physical properties of object E can be determined by setting the threshold value for determining the physical properties of object E based on the spectral reflectance curves.

Note that the method of calculating reflectance R is not limited to the above-described method. For example, reflectance R can also be obtained by the following method. Note that a case where the reflectance of object E1 (E4) is obtained will be described as an example.

First, an image of object E1 is extracted from extracted image p1. At this time, an image excluding a single pixel surrounding object E1 is extracted. As a result, object E1 present in the entire region of extracted image p1 can be extracted. Furthermore, similarly to extracted image p1, an image of object E4 is extracted from extracted image p4.

Subsequently, average luminance value δ' is obtained by averaging luminance values of the image among images of object E1 extracted from extracted image p1. Furthermore, average luminance value α' is obtained by averaging the luminance values of the images among the images of object E4 extracted from extracted image p4. Reflectance R of object E1 (E4) in the first wavelength band is obtained based on average luminance value α' and average luminance value δ'. Specifically, reflectance R is obtained by (average luminance value α')/(average luminance value δ'). As described above, it is possible to reduce an error in the reflectance caused by the influence of a singular point by performing averaging processing on luminance values used in obtaining the reflectance.

Note that substances other than metals can also be detected as object E. For example, it is also possible to measure a resin. The reflectance of the resin is low in a visible light region and high in an infrared region. Thus, when the resin is detected, it is necessary to widen the first wavelength band and the reference wavelength band to 1000 nm for measurement.

Object Size Determination

Figure 10A:
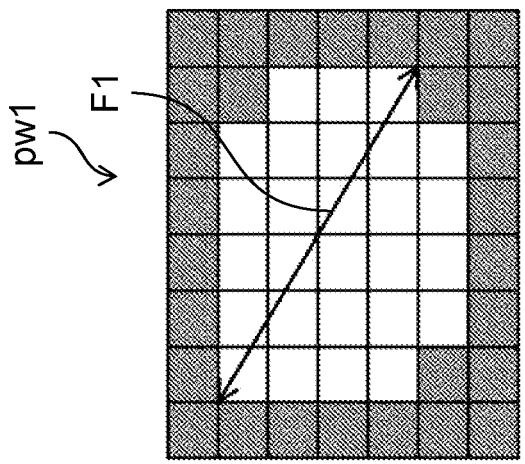
FIG. 10A is a diagram depicting an object size determination method according to the first exemplary embodiment.
Figure 10B:
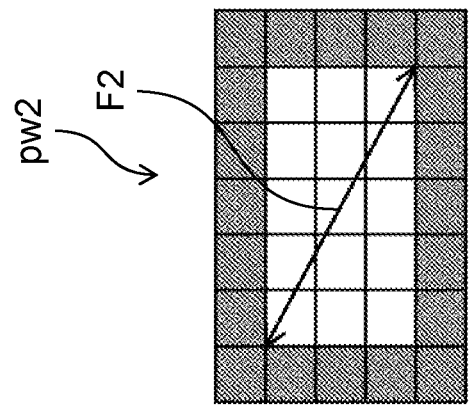
FIG. 10B is a diagram depicting the object size determination method according to the first exemplary embodiment.
Figure 10C:
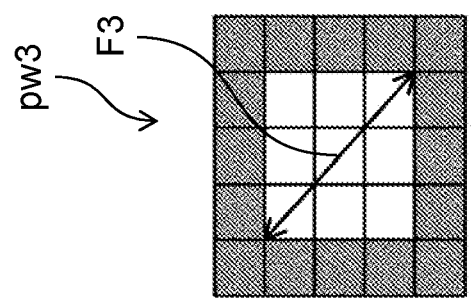
FIG. 10C is a diagram depicting the object size determination method according to the first exemplary embodiment.

Next, size determination processing (step S7) of image processing device 6 will be described with reference to FIGS. 10A to 10C. FIGS. 10A to 10C are diagrams depicting an object size determination method according to the first exemplary embodiment.

Specifically, FIGS. 10A to 10C illustrate corrected images pw1 to pw3 obtained by performing binarization processing on extracted image p1 to p3 with luminance value 30 as the threshold value. Extracted images p1 to p3 are images of object E (E1 to E3) generated by the light in the reference wavelength band. Since the extracted images by the light in the reference wavelength band have feature quantities (luminance) higher than the feature quantities of the extracted images by the light in the first wavelength band, the size of object E can be accurately determined. Note that the size may be determined by using extracted images p1 to p3 that are the images of object E (E1 to E3) generated by the light in the first wavelength band.

Aspects such as an area, a maximum length, an aspect ratio, a vertical width, a horizontal width, a Feret diameter (maximum value, minimum value, or the like), and a length of a main axis (maximum value, minimum value, or the like) are used as the size of object E. In the present exemplary embodiment, a case where the maximum Feret diameter F is obtained as the size of object E will be described as an example. Since the Feret diameter refers to longitudinal and lateral lengths of a rectangle circumscribing a certain object, the maximum Feret diameter indicates a maximum length of the rectangle circumscribing the object.

In FIGS. 10A to 10C, a length indicated by an arrow is the maximum Feret diameter of objects E1 to E3. As a result, the sizes of objects E1 to E3 can be determined.

Note that the sizes of objects E1 to E3 may be determined by using extracted images p1 to p3 as they are without performing the binarization processing on extracted images p1 to p3.

As described above, inspection apparatus A according to the present exemplary embodiment includes illumination device 2 capable of emitting first light in the first wavelength band and reference light in the reference wavelength band overlapping with the first wavelength band, imaging device 1 that captures sheet S (inspection body) and outputs the pixel signal, and image processing device 6. Illumination device 2 emits the first light and the reference light to sheet S at different timings in one imaging time. Image processing device 6 calculates first reflectance R, which is the reflectance of object E in the first wavelength band, based on the pixel signal, and determines the physical properties of object E based on first reflectance R. That is, illumination device 2 emits the first light and the reference light to sheet S at different timings in one imaging time, and thus, extracted image p of object E by the first light and extracted image p of object E by the reference light are formed in one image. Since first reflectance R of object E in the first wavelength band can be obtained based on two extracted images p, the physical properties of object E can be determined. Furthermore, since extracted image p of object E by the first light and extracted image p of object E by the reference light are included in one image, it is not necessary to capture sheet S for each wavelength band, and the increase in the imaging time can be suppressed. Therefore, it is possible to determine the physical properties of object E while suppressing the increase in the imaging time.

Furthermore, the feature quantity in extracted image p is the luminance value or the brightness of object E. As a result, the physical property of object E can be determined based on the luminance value or the brightness of object E.

Furthermore, image processing device 6 determines the size of object E by using extracted image p of object E by the light in the reference wavelength band. As a result, the size of object E can be determined.

Second Exemplary Embodiment

A second exemplary embodiment is different from the first exemplary embodiment in the configuration of illumination device 2 and the operations of the imaging device and the image processing device. Note that, in the second exemplary embodiment, the same configurations as the configurations in the first exemplary embodiment are assigned with the same reference numerals and redundant descriptions thereof are omitted.

Operation of Imaging Device and Illumination Device

In the second exemplary embodiment, illumination device 2 can emit light rays in first to third wavelength bands and a reference wavelength band. The first wavelength band is a red wavelength band (625 nm to 780 nm), the second wavelength band is a green wavelength band (500 nm to 565 nm), the third wavelength band is a blue wavelength band (450 nm to 485 nm), and the reference wavelength band is 400 nm to 800 nm. Furthermore, the reference wavelength band may not include the entire first wavelength band, and may include a part of the first wavelength band. For example, when the first wavelength band is 625 nm to 780 nm, the reference wavelength band may be 400 nm to 700 nm. Furthermore, the reference wavelength band does not necessarily include the entire first wavelength band, second wavelength band, and third wavelength band, and may include a part of each wavelength band. That is, the reference wavelength band may be a wavelength band overlapping with the first wavelength band, the second wavelength band, and the third wavelength band.

FIG. 11 is a timing chart illustrating an imaging timing of an imaging device and an emission timing of an illumination device in an inspection apparatus according to the second exemplary embodiment. As illustrated in FIG. 11, exposure of imaging element 11, reading of pixel signals, and light emission by illumination device 2 are performed in one frame.

Illumination device 2 emits light rays in four different wavelength bands (here, the first to third wavelength bands and the reference wavelength band) at different timings within one exposure time. Specifically, illumination device 2 emits light in the reference wavelength band after a predetermined pulse (for example, 0 pulses) from the start of exposure. A turning-on time at this time is 2 μsec to 5 μsec. Furthermore, illumination device 2 emits light in the first wavelength band after a predetermined pulse (for example, 500 pulses) from the start of exposure. A turning-on time at this time is 3 μsec. Furthermore, illumination device 2 emits light in the second wavelength band after a predetermined pulse (for example, 1500 pulses) from the start of exposure. A turning-on time at this time is 3 μsec. Furthermore, illumination device 2 emits light in the third wavelength band after a predetermined pulse (for example, 3000 pulses) from the start of exposure. A turning-on time at this time is 3 μsec.

That is, an imaging position of one object E can be set to be different in the Y direction by emitting the light rays in the first to third wavelength bands and the reference wavelength band at different timings. Specifically, images of object E by the emission of the light rays in the first to third wavelength bands are generated at positions offset (hereinafter, may be referred to as first to third offset values, respectively) by 500 μm, 1500 μm, and 3000 μm in the Y direction as a basis of an image of object E by the emission of the light in the reference wavelength band.

Image Extraction Processing

Figure 12:
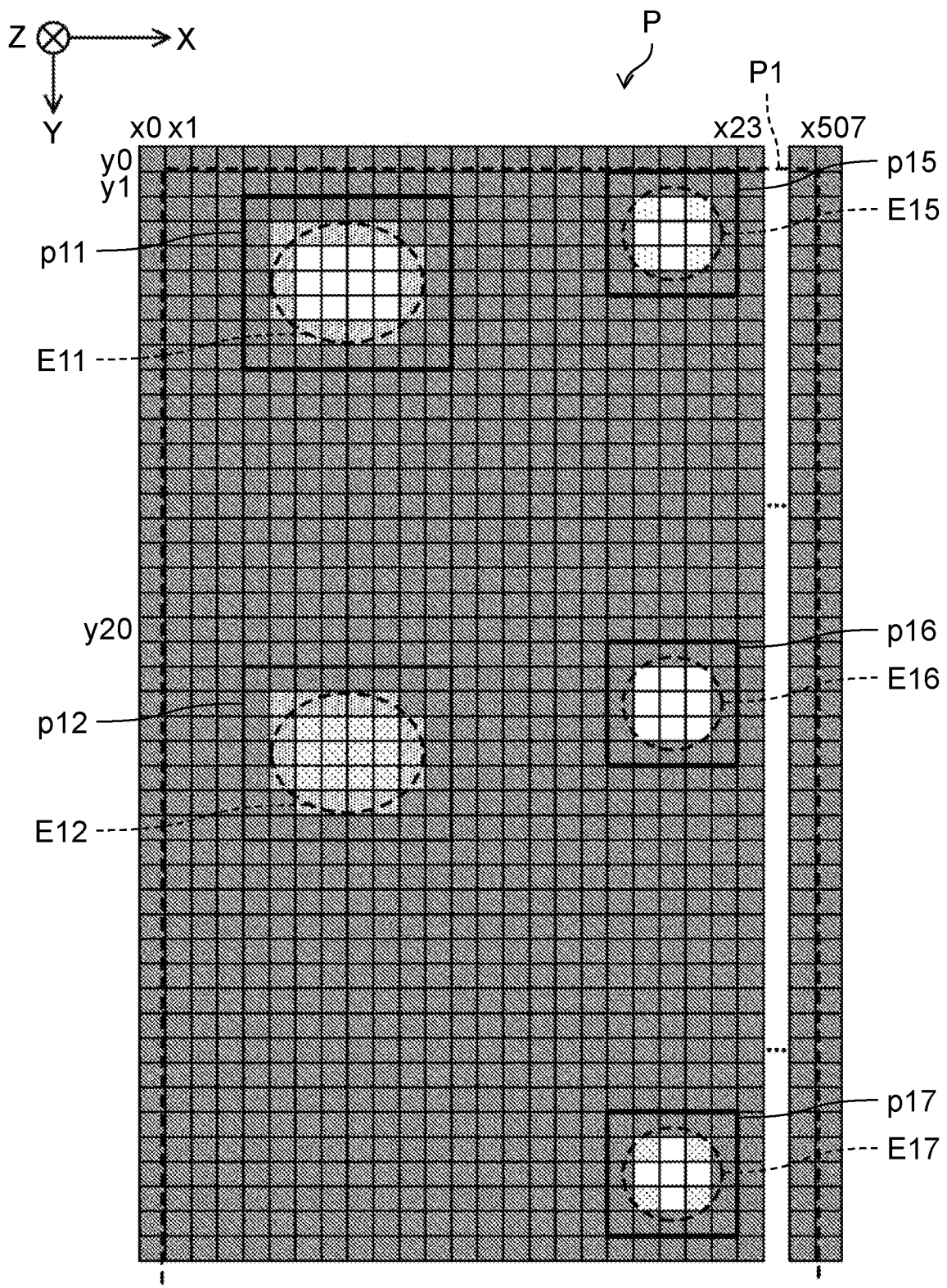
FIG. 12 is a diagram illustrating an example image of a sheet captured by an imaging element according to the second exemplary embodiment.
Figure 13:
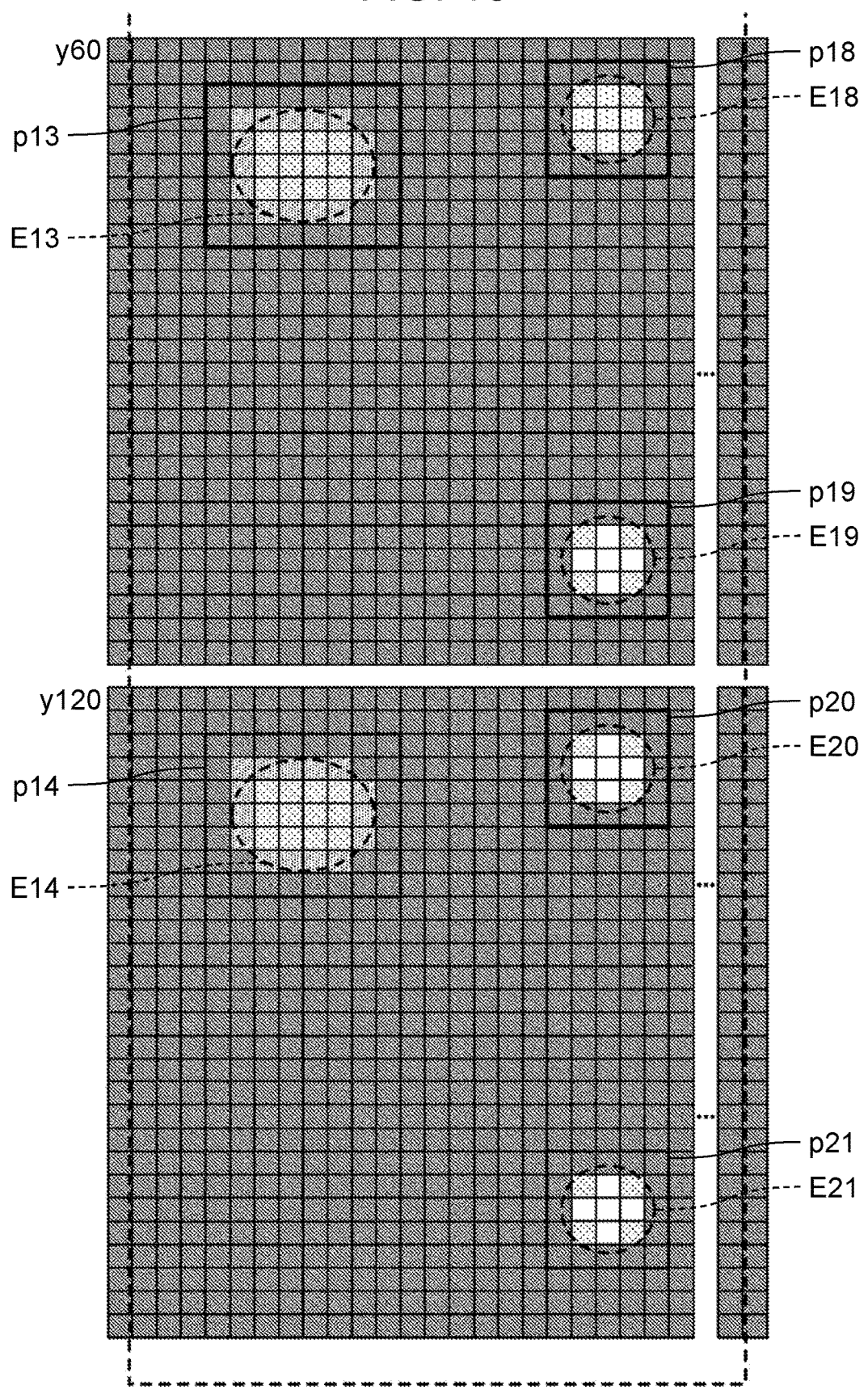
FIG. 13 is a diagram illustrating an example image of the sheet captured by the imaging element according to the second exemplary embodiment.

FIGS. 12 and 13 are diagrams illustrating example images of a sheet captured by an imaging element according to the second exemplary embodiment. FIGS. 14A to 14F and FIGS. 15G to 15K are diagrams illustrating examples of luminance values of extracted images according to the second exemplary embodiment. Note that FIG. 12 illustrates a region of an image (x0, y0) to an image (x507, y59) of image P, and FIG. 13 illustrates a region of an image (x0, y60) to an image (x507, y180) of image P. FIGS. 14A to 14F and 15G to 15K illustrate extracted images p11 to p21 of FIGS. 12 and 13, respectively. Furthermore, objects illustrated in extracted images p11 to p21 are set as objects E11 to E21, respectively.

As described above, illumination device 2 emits the light rays in the first to third wavelength bands and the reference wavelength band at different timings within one exposure time. Thus, in image P, extracted images of the number of objects×4 are generated. However, only 11 extracted images are formed in FIGS. 12 to 15K. This is considered that since two objects E are on the same X coordinate, images of different objects E (extracted image p16 in FIG. 12) overlap with each other. Therefore, in the present exemplary embodiment, it is possible to extract object E without omission by performing grouping processing of the extracted images (objects) illustrated in FIG. 16.

Figure 16:
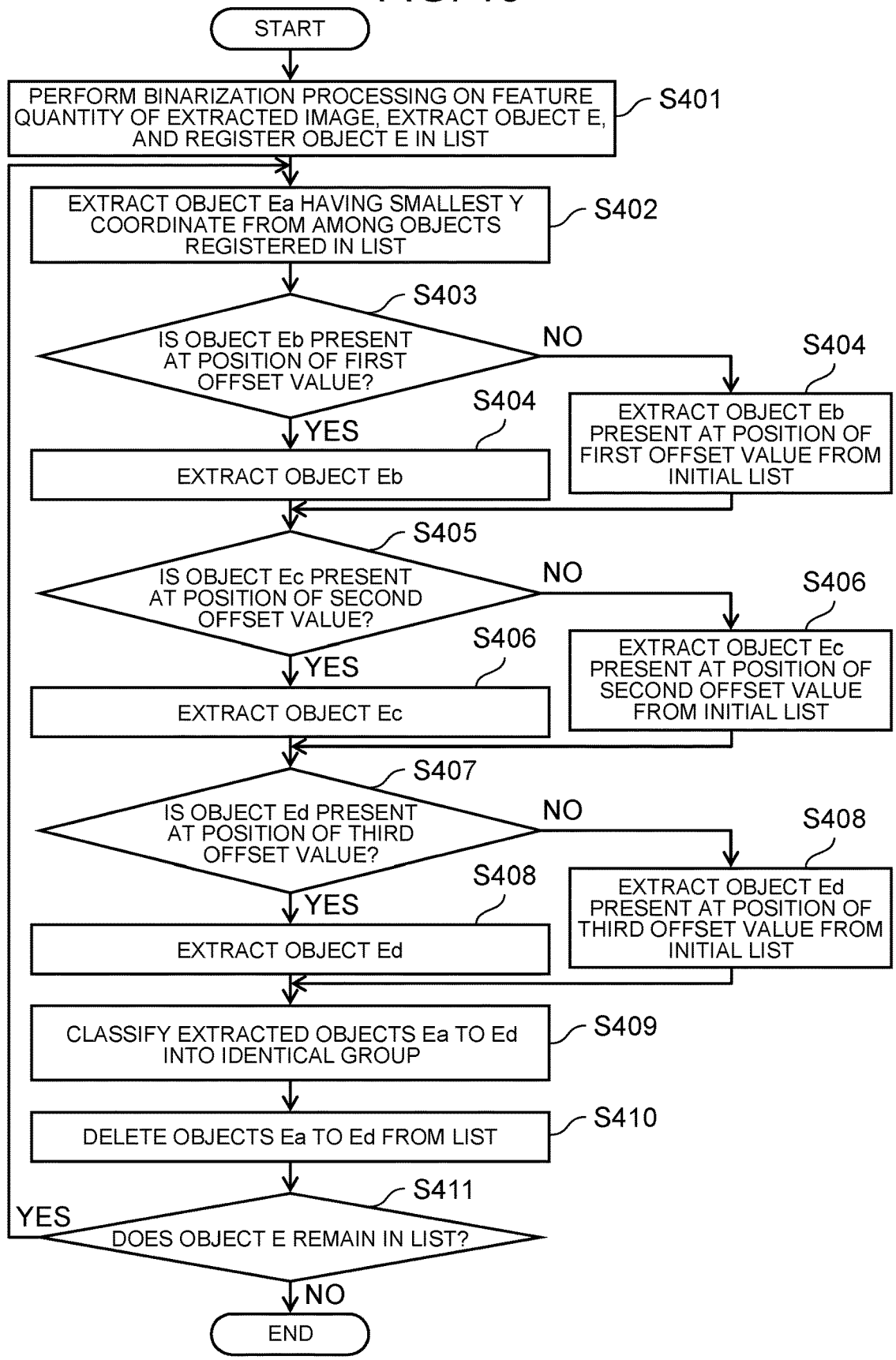
FIG. 16 is a flowchart depicting a flow of grouping processing of an image processing device according to the second exemplary embodiment.

In the present exemplary embodiment, in step S12 in FIG. 8, grouping the processing in FIG. 16 is executed. FIG. 16 is a flowchart illustrating the grouping processing according to the second exemplary embodiment.

First, image processing device 6 performs binarization processing on extracted images p11 to p21 with a predetermined feature quantity as a threshold value (for example, 20), extracts objects E11 to E21 from each extracted image, and registers the extracted objects in a list (step S401). Examples of the feature quantity at this time include a luminance value, a position of an object, a Feret diameter, and the like. In the present exemplary embodiment, a case where the feature quantity is the luminance value will be described as an example.

Subsequently, image processing device 6 extracts object Ea having a smallest Y coordinate from among objects E registered in the list (step S402). Image processing device 6 determines whether or not object Eb is present at a position of a first offset value in a positive direction of a Y-axis as a basis of X and Y coordinates of object Ea (step S403). The first offset value refers to a distance caused by a difference in timing at which illumination device 2 emits the light in the reference wavelength band and the light in the first wavelength band.

When it is determined that object Eb is present at the position of the first offset value (Yes in step S403), image processing device 6 extracts object Eb (step S404a). On the other hand, when it is determined that object Eb is not present at the position of the first offset value (No in step S403), image processing device 6 reads an initial list, and extracts object Eb present at the position of the first offset value in the positive direction of the Y-axis as a basis of the X and Y coordinates of object Ea (step S404a). As will be described in detail later, the extracted object is deleted from the list. Thus, when the objects overlap (for example, object E16 of FIG. 12), the object may be already deleted from the list. Here, in order to extract object E without omission, object Eb is extracted from the initial list. Note that, in the processing of steps S406b and S408b to be described below, substantially the same processing as the processing of step S404a is performed for the same reason.

After steps S404a and S404b, image processing device 6 determines whether or not object Ec is present at a position of a second offset value in the positive direction of the Y-axis as a basis of the X and Y coordinates of object Ea (step S405). The second offset value refers to a distance caused by a difference in timing at which illumination device 2 emits the light in the reference wavelength band and the light in the second wavelength band. When it is determined that object Ec is present at the position of the second offset value (Yes in step S405), image processing device 6 extracts object Ec (step S406a). On the other hand, when it is determined that object Ec is not present at the position of the second offset value (No in step S405), image processing device 6 reads the initial list, and extracts object Ec present at the position of the second offset value in the positive direction of the Y-axis as a basis of the X and Y coordinates of object Ea (step S406a).

After steps S406a and S406b, image processing device 6 determines whether or not object Ed is present at a position of a third offset value as a basis of the X and Y coordinates of object Ea (step S407). The third offset value refers to a distance caused by a difference in timing at which illumination device 2 emits the light in the reference wavelength band and the light in the third wavelength band. When it is determined that object Ed is present at the position of the third offset value (Yes in step S407), image processing device 6 extracts object Ed (step S408a). On the other hand, when it is determined that object Ed is not present at the position of the third offset value (No in step S407), image processing device 6 reads the initial list, and extracts object Ed present at the position of the third offset value in the positive direction of the Y-axis as a basis of the X and Y coordinates of object Ea (step S408a).

After steps S406a and S406b, image processing device 6 classifies extracted objects Ea to Ed into the same group (step S409). Image processing device 6 deletes extracted objects Ea to Ed from the list (step S410).

After step S410, image processing device 6 determines whether the object remains in the list (step S411). When it is determined that the object remains in the list (Yes in step S411), image processing device 6 returns to step S401 and performs the grouping processing again. When it is determined that the object does not remain in the list (Yes in step S411), image processing device 6 ends the processing. That is, image processing device 6 performs the grouping processing until all the objects are classified. By this grouping, objects E classified into the same group indicate same object E.

Note that, when the initial list is read and object Eb is not present at the position of the first offset value in the positive direction of the Y-axis as a basis of the X and Y coordinates of object Ea in step S404b, it is considered that object Ea is not generated by emitting the light in the reference wavelength band but generated by emitting any one of the light rays in the first to third wavelength bands. In this case, image processing device 6 extracts, from the initial list, the objects at the positions of the first to third offset values in a negative direction of the Y-axis as a basis of the X and Y coordinates of object Ea. The extracted object is set as object Ea, and the processing in step S403 and subsequent steps is performed again. As described above, the first to third offset values are set to different values. Thus, only one true object Ea is extracted.

For example, in FIGS. 12 and 13, objects E11 to E21 are registered in the initial list, and objects E15, E16, E18, and E20 are classified into the same group by first grouping processing. Subsequently, objects E11 to E14 are classified into the same group by second grouping processing. In third grouping processing, object E17 is determined as object Ea. At this time, all objects E19 and E21 remaining in the list are not present at the position of the first offset value in the positive direction of the Y-axis from object E17. Thus, image processing device 6 cannot extract object Eb. Therefore, image processing device 6 extracts object E at the positions of the first to third offset values in the negative direction of the Y-axis as a basis of object E17. At this time, since object E16 is present at the position of the first offset value in the negative direction of the Y-axis of object E17, image processing device 6 determines that object E16 is true object Ea. As a result, image processing device 6 executes the processing step S403 and subsequent steps with object E16 as object Ea, and classifies objects E16, E17, E19, and E21 into the same group.

Here, since illumination device 2 emits the light rays in the order of the light rays in the reference wavelength band and the first to third wavelength bands, objects E (extracted images p) classified into the same group can be determined as an extracted image (hereinafter, referred to as a "reference image") generated by emitting the light in the reference wavelength band to extracted image p having the smallest Y coordinate, an extracted image (hereinafter, referred to as a "first image") generated by emitting the light in the first wavelength band to extracted image p having the second smallest Y coordinate, an extracted image (hereinafter, referred to as a "second image") generated by emitting the light in the second wavelength band to extracted image p having the third smallest Y coordinate, and an extracted image (hereinafter, referred to as a "third image") generated by emitting the light in the third wavelength band to extracted image p having the largest Y coordinate. For example, in FIGS. 12 to 15K, the reference images are extracted images p11, p15, and p16, the first images are extracted images p12, p16, and p17, the second images are extracted images p13, p18, and p19, and the third images are extracted images p14, p20, and p21.

Next, generation processing of an original extracted image will be described.

In the grouping processing described above, when one object E is classified into a plurality of groups, extracted images p of overlapping objects E are grouped. In this case, reflectance R of object E cannot be determined from extracted image p of overlapping object E, and the physical properties of object E cannot be accurately determined. Thus, image processing device 6 performs processing of generating extracted image p of original object E. In FIG. 8, the processing step S13 and subsequent steps is performed by using extracted image p generated by this processing.

In one processing of generating the original extracted image, for example, when the reference image overlaps with another extracted image p, the original reference image can be generated by combining the first to third images belonging to the same group. For example, in FIGS. 14A to 14F, extracted image p11 can be generated by combining extracted images p12 to p14.

Furthermore, when any one of the first to third images has an overlap with another extracted image p, it is possible to generate the extracted image by subtracting the extracted image having no overlap with another extracted image p among the first to third images from the reference image. For example, in FIGS. 14A to 14F, extracted image p12 can be generated by subtracting the feature quantities of extracted images p11 and p13 from the feature quantity of extracted image p14.

Furthermore, when any one of the first to third extracted images has an overlap with another extracted image p, the extracted image can be generated from a calculable reflectance of object E. As will be described in detail later, in extracted images p belonging to the same group, an image having the largest feature quantity among the reference images is defined as image $\delta$, an image having the largest feature quantity among the first images is defined as image $\alpha$, an image having the largest feature quantity among the second images is defined as image $\beta$, and an image having the largest feature quantity among the third images is defined as image $\gamma$. In this case, reflectance R of object E in the first wavelength band is (the luminance value of image $\alpha$)/(luminance value of image $\delta$). Reflectance R of object E in the second wavelength band is (luminance value of image $\beta$)/(luminance value of image $\delta$). Reflectance R of object E in the third wavelength band is (luminance value of image $\beta$)/(luminance value of image $\delta$).

For example, in FIGS. 12 to 15K, in extracted image p16, images of two objects E overlap. Thus, extracted image p16 cannot be used as the first image of object E15.

Figure 17A:
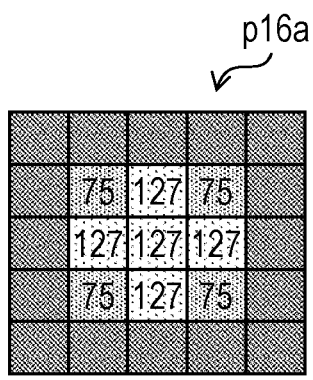
FIG. 17A is a diagram depicting processing of generating an original extracted image according to the second exemplary embodiment.

Here, as illustrated in FIGS. 14A to 14F and FIGS. 15G to 15K, from extracted images p15 and p18 (second images), since reflectance R22 of object E15 (E18 and E20) in the second wavelength band is 150/255≈0.59, reflectance R22 is 59%. From extracted images p15 and p20 (third images), since reflectance R23 of object E15 in the third wavelength band is 204/255≈0.8, reflectance R23 is 80%. Here, it can be determined that object E15 is Cu by referring to the spectral reflectance curve of FIG. 9. As a result, it can be determined that reflectance R21 of object E15 in the first wavelength band is about 50%. The feature quantity (luminance value) of extracted image p15 is multiplied by reflectance R23, and thus, extracted image p16a (see FIG. 17A) of object E15 in the first wavelength band can be generated.

Figure 17B:
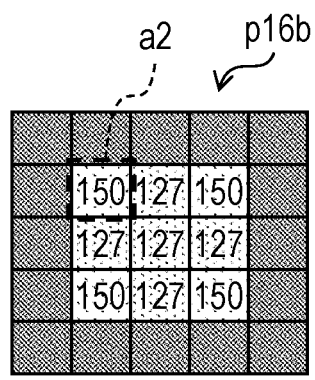
FIG. 17B is a diagram depicting the processing of generating the original extracted image according to the second exemplary embodiment.
Figure 17C:
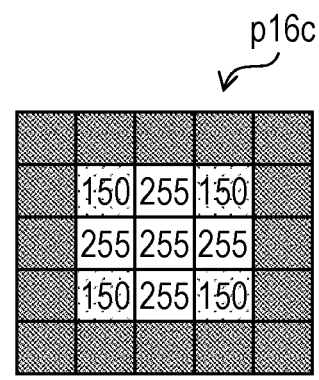
FIG. 17C is a diagram depicting the processing of generating the original extracted image according to the second exemplary embodiment.

Furthermore, the reference image of object E17 can be generated by subtracting estimated extracted image p16a from extracted image p16. However, in this image generation method, as illustrated in FIG. 17B, a luminance value of a central portion of the image becomes higher than a luminance value of a peripheral portion of the image, and extracted image p16b cannot be correctly estimated. This is considered that since a highest luminance value exceeds 255 as a result of overlapping of two objects E16 and E17 in extracted image p16. Therefore, the reference image of object E17 can be estimated by using extracted image p18 belonging to the same group as object E17 and having no overlap. Specifically, all the images of extracted image p18 are multiplied by a maximum magnification (image a2/image a1=150/110) of extracted images p16b and p18, and thus, extracted image p16c (FIG. 17C) of object E17 in the reference wavelength band can be generated.

Physical Property Determination Processing

Next, the physical property determination processing (step S5) of image processing device 6 according to the second exemplary embodiment will be described with reference to FIG. 18. FIG. 18 is a flowchart depicting a flow of the physical property determination processing of the image processing device according to the second exemplary embodiment.

When extracted images p (in FIG. 18, extracted images p11 to p21 and the estimated extracted image) are acquired (step S31), image processing device 6 extracts image $\delta$ having the highest feature quantity from among the images included in the reference image (extracted image p having the smallest Y coordinate) among extracted images p belonging to the same group (step S32).

Image processing device 6 extracts image $\alpha$ having the highest feature quantity from among the images included in the first image (extracted image p having the second smallest Y coordinate) among extracted images p belonging to the same group (step S33).

Image processing device 6 extracts image $\beta$ having the highest feature quantity from among the images included in the second image (extracted image p having the third smallest Y coordinate) among extracted images p belonging to the same group (step S34).

Image processing device 6 extracts image $\gamma$ having the highest feature quantity from among the images included in the third image (extracted image p having the largest Y coordinate) among extracted images p belonging to the same group (step S35).

For example, in FIG. 18, extracted images p11 to p14 are classified into the same group. In FIG. 18, in extracted images p11 to p14, image $\delta$4 of extracted image p11 corresponds to image $\delta$, image $\alpha$4 of extracted image p12 corresponds to image $\alpha$, image $\beta$4 of extracted image p13 corresponds to image $\beta$, and image $\gamma$4 of extracted image p14 corresponds to image $\gamma$.

After step S35, reflectances R31 to R33 of object E11 (E12 to E14) in the first wavelength band, the second wavelength band, and the third wavelength band are obtained based on the luminance values of image $\delta$ and images $\alpha$, $\beta$, and $\gamma$ (step S36). Specifically, reflectance R31 can be obtained by (luminance value of image $\alpha$)/(luminance value of image $\delta$). Reflectance R32 can be obtained by (luminance value of image $\beta$)/(luminance value of image $\delta$). Reflectance R33 can be obtained by (luminance value of image $\gamma$)/(luminance value of image $\delta$).

For example, in FIG. 18, reflectance R31 of object E11 is 140/255≈0.55, and reflectance R31 of object E1 is 55%. Reflectance R32 of object E1 is 155/255≈0.60, and reflectance R32 of object E11 is 60%. Reflectance R33 of object E11 is 155/255≈0.60, and reflectance R33 of object E11 is 60%. Reflectance R can be similarly obtained for objects E15 and E17 as follows.

After step S36, the reflectances are plotted on a graph (step S37). Obtained reflectance R in each wavelength band is plotted on the graph with the wavelength on an X-axis and reflectance R on the Y-axis. In the present exemplary embodiment, reflectance R in each wavelength band is plotted as a median value of the wavelength band (see FIG. 19).

Figure 19:
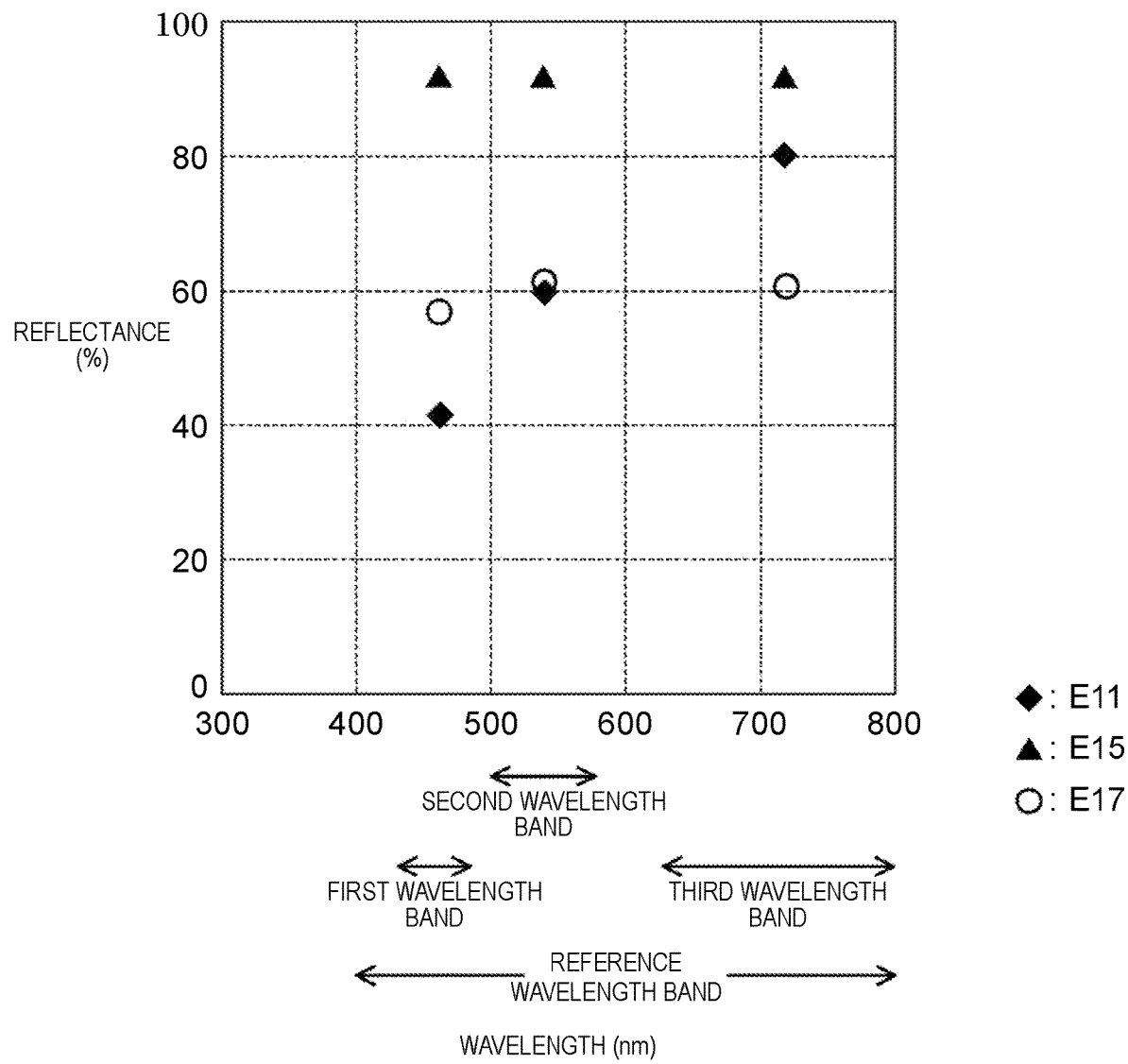
FIG. 19 is a diagram illustrating a graph in which reflectances are plotted according to the second exemplary embodiment.

The plotted reflectances in FIG. 19 are compared with the spectral reflectance curves in FIG. 9, the closest spectral reflectance curve is selected from the correlation, and the physical properties of object E are determined based on the spectral reflectance curve (step S38). The plot of reflectance R of object E11 (E12 to E14) is closest to the spectral reflectance curve of Fe in FIG. 9. Therefore, image processing device 6 determines that object E11 is Fe. The plot of reflectance R of object E15 (E16, E18, and E20) is closest to the spectral reflectance curve of Al in FIG. 9. Therefore, image processing device 6 determines that object E15 is Al. The plot of reflectance R of object E17 (E16, E19, and E21) is closest to the spectral reflectance curve of Cu in FIG. 9. Therefore, image processing device 6 determines that object E17 is Cu.

As described above, inspection apparatus A according to the present exemplary embodiment includes illumination device 2 capable of emitting the first light in the first wavelength band, the second light in the second wavelength band, and the reference light in the reference wavelength band overlapping the first and second wavelength bands, imaging device 1 that captures sheet S (inspection body) and outputs the pixel signal, and image processing device 6. Illumination device 2 emits the first light, the second light, and the reference light to sheet S at different timings in one imaging time. Image processing device 6 calculates first reflectance R31 which is the reflectance in the first wavelength band and second reflectance R32 which is the reflectance in the second wavelength band of object E based on the pixel signal, and determines the physical properties of object E based on first and second reflectances R31 and R32. That is, illumination device 2 emits the first light, the second light, and the reference light to sheet S at different timings in one imaging time, and thus, extracted image p of object E by the first light, extracted image p of object E by the second light, and extracted image p of object E by the reference light are formed in one image. Since first and second reflectances R31 and R32 of object E in the first and second wavelength bands can be obtained based on three extracted images p, the physical properties of object E can be determined. Furthermore, since one image includes extracted image p of object E by the first light, extracted image p of object E by the second light, and extracted image p of object E by the reference light, it is not necessary to capture sheet S for each wavelength band, and the increase in the imaging time can be suppressed. Therefore, it is possible to determine the physical properties of the object while suppressing the increase in the imaging time.

Furthermore, image processing device 6 determines the physical properties of object E by comparing first and second reflectances R31 and R32 with spectral reflectance data indicating spectral reflectances of a plurality of substances. As a result, the physical properties of object E can be accurately determined.

Furthermore, when a plurality of objects E are present on sheet S, image processing device 6 generates the remaining one image from any two images of the first image that is an extracted image p of object E by the first light, the second image that is an extracted image p of object E by the second light, and the reference image that is an extracted image p of object E by the reference light. As a result, even when any one of the first image, the second image, and the reference image overlaps with extracted image p of another object E in image P generated from the pixel signal, the image can be generated from the other image except for the image among the first image, the second image, and the reference image.

Furthermore, image processing device 6 combines the feature quantities of the first image and the second image to generate the reference image. As a result, even when the reference image overlaps with another extracted image p in image P, the reference image can be generated from the first image and the second image.

Furthermore, image processing device 6 generates the second image by subtracting the feature quantity of the first image from the feature quantity of the reference image. As a result, even when the first image overlaps with another extracted image p in image P, the first image can be generated from the reference image and the second image.

Furthermore, when the plurality of objects E are present on sheet S, image processing device 6 classifies the first image, the second image, and the reference image for each of the plurality of objects E. Furthermore, image processing device 6 calculates the first reflectance and the second reflectance based on the first image, the second image, and the reference image classified into the same group. As a result, when the plurality of objects E are present on sheet S, the physical properties can be determined for each object E.

Other Exemplary Embodiments

As described above, the exemplary embodiments have been described as illustrations of the technique disclosed in the present application. However, the technique in the present disclosure is not limited to the exemplary embodiments and is applicable to exemplary embodiments appropriately subjected to changes, replacements, additions, omissions, and the like.

Note that imaging device 1 and illumination device 2 are configured as a dark field optical system in the above exemplary embodiments, but may be configured as a bright field optical system. Furthermore, imaging device 1 is configured as the line sensor, but may be configured as an area sensor. Furthermore, image processing device 6 may generate a moving image or a still image from the pixel signal output from imaging element 11.

Furthermore, the arrangement of pixels 10 arranged in imaging element 11 is not limited to the above-described arrangement. Furthermore, the number of pixels of imaging element 11 is not limited to the above-described number.

According to the present disclosure, it is possible to determine the physical properties of the object while suppressing the increase in the imaging time.

The inspection apparatus of the present disclosure can be used for inspection of foreign substance or defects included in members used for semiconductors, electronic devices, secondary batteries, and the like.

What is claimed is:

1. An inspection method for detecting an object included in an inspection body by imaging the inspection body by an inspection apparatus,
   the inspection apparatus including
      an illumination device that is capable of emitting first light in a first wavelength band and reference light in a reference wavelength band overlapping with the first wavelength band, and
      an imaging device that images the inspection body, and outputs a pixel signal, the inspection method comprising:
emitting, by the illumination device, the first light and the reference light to the inspection body at different timings in one imaging time; and
generating an image based on the pixel signal.

2. The inspection method according to claim 1, wherein the inspection apparatus includes an image processing device,
the inspection method further comprising:
calculating, by the image processing device, a first reflectance that is a reflectance of the object in the first wavelength band based on the pixel signal; and
determining, by the image processing device, physical properties of the object based on the first reflectance.

3. An inspection method for detecting an object included in an inspection body by imaging the inspection body by an inspection apparatus,
the inspection apparatus including
an illumination device that is capable of emitting first light in a first wavelength band, second light in a second wavelength band, and reference light in a reference wavelength band overlapping with the first and second wavelength bands, and
an imaging device that images the inspection body, and outputs a pixel signal,
the inspection method comprising:
emitting, by the illumination device, the first light, the second light, and the reference light to the inspection body at timings different from each other in one imaging time; and
generating an image based on the pixel signal.

4. The inspection method according to claim 3, wherein the inspection apparatus includes an image processing device,
the inspection method further comprising:
calculating, by the image processing device, a first reflectance that is a reflectance of the object in the first wavelength band and a second reflectance that is a reflectance in the second wavelength band based on the pixel signal; and
determining, by the image processing device, physical properties of the object based on the first reflectance and the second reflectance.

5. The inspection method according to claim 4, wherein the image processing device determines the physical properties of the object by comparing the first reflectance and the second reflectance with spectral reflectance data indicating spectral reflectances of a plurality of substances.

6. The inspection method according to claim 4, further comprising generating, by the image processing device, a remaining one image from any two images of first images that are images of a plurality of objects by the first light, second images that are images of the plurality of objects by the second light, and reference images that are images of the plurality of objects by the reference light when the plurality of objects are present in the inspection body.

7. The inspection method according to claim 6, further comprising generating, by the image processing device, the reference image by combining feature quantities of the first image and the second image.

8. The inspection method according to claim 6, further comprising generating, by the image processing device, the second image by subtracting a feature quantity of the first image from a feature quantity of the reference image.

9. The inspection method according to claim 7, wherein the feature quantity is a luminance value or brightness of the object.

10. The inspection method according to claim 8, wherein the feature quantity is a luminance value or brightness of the object.

11. The inspection method according to claim 4, further comprising:
generating, by the image processing device, a first image that is an image of the object by the light in the first wavelength band, a second image that is an image of the object by the light in the second wavelength band, and a reference image that is an image of the object by the light in the reference wavelength band for each of a plurality of the objects when the plurality of objects are present in the inspection body;
classifying, by the image processing device, the first image, the second image, and the reference image for each of the plurality of objects; and
calculating the first reflectance and the second reflectance based on the first image, the second image, and the reference image classified into a same group.

12. The inspection method according to claim 2, further comprising determining, by the image processing device, a size of the object by using a reference image that is an image of the object by the light in the reference wavelength band.

13. An inspection apparatus that detects an object included in an inspection body by imaging the inspection body, the inspection apparatus comprising:
an illumination device that is capable of emitting first light in a first wavelength band and reference light in a reference wavelength band overlapping with the first wavelength band; and
an imaging device that images the inspection body, and outputs a pixel signal;
wherein
the illumination device emits the first light and the reference light to the inspection body at different timings in one imaging time, and
an image is generated based on the pixel signal.

14. The inspection apparatus according to claim 13, further comprising an image processing device, wherein the image processing device calculates a first reflectance that is a reflectance of the object in the first wavelength band based on the pixel signal, and determines physical properties of the object based on the first reflectance.

* * * * *